(12) United States Patent
Klinge et al.

(10) Patent No.: US 11,279,556 B2
(45) Date of Patent: Mar. 22, 2022

(54) ROBOT AND METHOD FOR RETRIEVAL OF A TARGET ARTICLE

(71) Applicant: MOVEBOT APS, Copenhagen S (DK)

(72) Inventors: Thomas Martin Klinge, Skanderborg (DK); Kristian Kassow, Copenhagen S (DK)

(73) Assignee: MOVEBOT APS, Skanderborg (DK)

( * ) Notice: Subject to any disclaimer, the term of this patent is extended or adjusted under 35 U.S.C. 154(b) by 211 days.

(21) Appl. No.: 16/640,892

(22) PCT Filed: Aug. 24, 2018

(86) PCT No.: PCT/EP2018/072920
§ 371 (c)(1),
(2) Date: Feb. 21, 2020

(87) PCT Pub. No.: WO2019/042898
PCT Pub. Date: Mar. 7, 2019

(65) Prior Publication Data
US 2020/0189845 A1    Jun. 18, 2020

(30) Foreign Application Priority Data

Aug. 31, 2017 (EP) ..................................... 17188842
Nov. 23, 2017 (EP) ..................................... 17203274

(51) Int. Cl.
*B65G 1/04* (2006.01)
*B65G 59/00* (2006.01)
(Continued)

(52) U.S. Cl.
CPC ............ *B65G 1/0435* (2013.01); *B25J 5/007* (2013.01); *B25J 9/0096* (2013.01); *B25J 9/107* (2013.01);
(Continued)

(58) Field of Classification Search
CPC ...... B65G 59/00; B65G 61/00; B65G 1/0435; B25J 9/0096; B25J 15/0052; B25J 9/0093
(Continued)

(56) References Cited

U.S. PATENT DOCUMENTS

| 3,187,917 | A | 6/1965 | Miller |
| 3,447,697 | A | 6/1969 | Morey et al. |
| 6,652,014 | B2 * | 11/2003 | Schmalz .............. B25J 15/0014 294/65 |
| 8,162,362 | B2 * | 4/2012 | Braunschweiger .... B65G 61/00 294/65 |

(Continued)

FOREIGN PATENT DOCUMENTS

| DE | 1001645 | 1/1957 |
| WO | 9402390 | 2/1994 |

*Primary Examiner* — Kaitlin S Joerger
(74) *Attorney, Agent, or Firm* — Duane Morris LLP; Gregory M. Lefkowitz

(57) ABSTRACT

A method and an associated robot for retrieval of a target article from an article stack are disclosed. The article stack comprising the target article and a first non-target article being positioned on top of the target article, the target article being arranged in the article stack with a lower target article face being at a first vertical stack position. The method comprises: identifying the target article; positioning a platform having a platform surface in a first vertical platform position wherein the platform surface is at the first vertical stack position or below the first vertical stack position; repositioning the target article and the first non-target article in a first horizontal direction onto the platform; and repositioning the first non-target article opposite the first horizontal direction off the platform.

15 Claims, 27 Drawing Sheets

(51) Int. Cl.
   *B65G 61/00* (2006.01)
   *B25J 5/00* (2006.01)
   *B25J 9/00* (2006.01)
   *B25J 9/10* (2006.01)
   *B25J 9/16* (2006.01)
   *B25J 15/00* (2006.01)
   *B25J 19/02* (2006.01)
   *B66F 9/075* (2006.01)

(52) U.S. Cl.
   CPC ............. *B25J 9/1633* (2013.01); *B25J 15/00* (2013.01); *B25J 19/021* (2013.01); *B65G 1/0421* (2013.01); *B65G 59/00* (2013.01); *B65G 61/00* (2013.01); *B66F 9/0755* (2013.01)

(58) Field of Classification Search
   USPC .................................. 414/797, 796.5, 796.6
   See application file for complete search history.

(56) References Cited

U.S. PATENT DOCUMENTS

| | | | | |
|---|---|---|---|---|
| 8,473,094 | B2* | 6/2013 | Becker | B65G 47/914 700/213 |
| 8,651,794 | B2* | 2/2014 | Pippin | B65G 67/08 414/398 |
| 10,124,967 | B2* | 11/2018 | Girtman | B65G 67/08 |
| 2002/0092728 | A1* | 7/2002 | Tanaka | B65G 1/137 198/301 |
| 2014/0205403 | A1* | 7/2014 | Criswell | B65G 67/24 414/395 |
| 2014/0341694 | A1* | 11/2014 | Girtman | B25J 11/00 414/796.5 |
| 2015/0063973 | A1* | 3/2015 | Girtman | B25J 15/0616 414/796.9 |
| 2015/0360882 | A1* | 12/2015 | Girtman | B25J 11/00 700/213 |
| 2017/0121109 | A1 | 5/2017 | Behling | |

\* cited by examiner

Fig. 11

ROBOT AND METHOD FOR RETRIEVAL OF A TARGET ARTICLE

CROSS-REFERENCE TO RELATED APPLICATIONS

This application is a § 371 national stage entry of International Application No. PCT/EP2018/072920, filed Aug. 24, 2018, which claims priority of European Application No. 17188842.3, filed Aug. 31, 2017, and European Application No. 17203274.0, filed Nov. 23, 2017, the entire contents of which are incorporated herein by reference.

The present disclosure relates to a method for retrieval of a target article from an article stack, such as an article stack of a plurality of article stacks, e.g. in a storage facility. The present disclosure furthermore relates to a robot configured to perform the disclosed method.

BACKGROUND

It is becoming increasingly common to exchange conventionally manual labour with automated processes, such as robots.

In storage facilities, manual labour has conventionally been used to locate and fetch articles.

Automating such processes of locating and fetching articles, may significantly reduce time for fetching an article and may further reduce costs of labour in relation hereto. However, automating such processes may potentially require a significant adaptation of the storage facility. Thus, automating such processes may require a significant investment.

Furthermore, automated systems may to a large degree require stringent conditions, leading to reduction of the flexibility of the storage facility, and increasing the risk of failure in the automated system if humans are accessing the storage facility.

SUMMARY

There is a need for a more convenient and flexible method for retrieval of an article in a storage facility.

Accordingly, a method and a robot for retrieval of a target article from an article stack is disclosed.

The article stack may be an article stack of a plurality of article stacks, e.g. in a storage facility. For example, the storage facility may comprise a plurality of articles arranged in the plurality of article stacks. The plurality of articles may comprise the target article and a first non-target article. The plurality of articles may comprise a plurality of non-target articles, e.g. including a first non-target article, a second non-target article, a third non-target article and/or a fourth non-target article.

The article stack comprises the target article and the first non-target article. The article stack may comprise the third non-target article and/or the fourth non-target article. The first non-target article is positioned on top of the target article. The target article may be positioned on top of the second non-target article. The third non-target article may be positioned on top of the first non-target article. The second non-target article may be positioned on top of the fourth non-target article. The target article is arranged in the article stack with a lower target article face being at a first vertical stack position.

The method comprises: identifying the target article; positioning a platform having a platform surface in a first vertical platform position wherein the platform surface is at the first vertical stack position or below the first vertical stack position; repositioning the target article and the first non-target article in a first horizontal direction onto the platform; and repositioning the first non-target article opposite the first horizontal direction off the platform, such as that the first non-target article is positioned in the article stack.

A robot, such as a robot configured to perform the method, is also disclosed.

The robot may comprise: a platform; a repositioning device; and/or an identification device. The platform is vertically movable. The platform has a platform surface. The repositioning device is vertically movable.

The robot may be configured to: identify the target article; position the platform in a first vertical platform position wherein the platform surface is at the first vertical stack position or below the first vertical stack position; reposition the target article and the first non-target article in a first horizontal direction onto the platform; and reposition the first non-target article opposite the first horizontal direction off the platform, such as that the first non-target article is positioned in the article stack.

It is an advantage of the disclosure that a method and a robot is provided which may be utilized in a conventional storage facility, such as a storage facility where articles are managed by manual labour.

It is a further advantage of the disclosure that articles may be retrieved from a stack, e.g. where articles are positioned on top of each other. It is thus also an advantage that the robot and method may work in a storage facility where more than one article is positioned on a single shelf.

It is a further advantage that articles may be retrieved from a stack while tilting or falling of remaining articles in the stack is prevented.

A horizontal direction may be a direction in the horizontal plane. The first horizontal direction may be towards the platform, such as from the article stack towards the platform. A second horizontal direction may be perpendicular to the first horizontal direction.

An article, such as an article of the plurality of articles in the storage facility, such as the target article and/or a non-target article, such as the first non-target article, the second non-target article, the third non-target article and/or the fourth non-target article, may be a box, such as a six-sided box, such as a cube, such as a shoe box. For example, an article may have a lower face, a front face, an upper face, a back face, a first side face and/or a second side face. The target article may have a lower target article face, a front target article face, an upper target article face, a back-target article face, a first side target article face and/or a second side target article face. The first non-target article may have a lower first non-target article face, a front first non-target article face, an upper first non-target article face, a back first non-target article face, a first side first non-target article face and/or a second side first non-target article face.

An article, such as an article of the plurality of articles in the storage facility, such as the target article and/or a non-target article, such as the first non-target article, the second non-target article, the third non-target article and/or the fourth non-target article, may have an article height, an article depth and/or an article width. For example, the target article may have a target article height, a target article depth and/or a target article width. The first non-target article may have a first non-target article height, a first non-target article depth and/or a first non-target article width. The dimensions of the articles, such as height, width and/or depth may not be the same for all articles. Minimum dimensions may be known, such as predetermined. For example, a minimum height, such as 8 cm, may be predetermined, and/or a minimum depth, such as 20 cm, may be predetermined, and/or a minimum width, such as 10 cm, may be predetermined. Maximum dimensions may be known, such as predetermined. For example, a maximum height, such as 12 cm, may be predetermined, and/or a maximum depth, such as 30 cm, may be predetermined, and/or a maximum width, such as 15 cm, may be predetermined.

An article, such as an article of the plurality of articles in the storage facility, such as the target article and/or a non-target article, such as the first non-target article, the second non-target article, the third non-target article and/or the fourth non-target article, may comprise an identification tag, e.g. on the front article face. For example, the target article may comprise a target identification tag on the front target article face. The identification tag, such as the target identification tag, may be a number, a bar code, an RFID tag, an NFC tag and/or other exemplary identification tags.

The platform may be configured to receive an article, such as the target article on the platform surface. The platform may be positioned in a plurality of vertical platform position. The platform may be positioned in a second vertical platform position. The platform may be positioned in a second vertical platform position after repositioning of the target article and the first non-target article onto the platform. The second vertical platform position may be below the first vertical platform position. The distance between the first vertical platform position and the second vertical platform position may be the target article height.

The first vertical platform position may be based on the position of the lower target article face in the stack, e.g. the first vertical stack position. The position of the lower target article face in the stack and/or the first vertical stack position may be initially unknown.

Positioning the platform in the first vertical platform position may comprise positioning the platform in a third vertical platform position, such as initially positioning the platform in the third vertical platform position. The third vertical platform position may be the minimum height below the target identification tag of the target article. For example, the target article may be located and the platform may be position the known minimum height of articles in the storage facility below the target identification tag. Thus, it is assured that only one article can be between the identification tag and the platform, and thereby the platform is positioned above a lower face of a possible article below the target article. Reposition force may be applied, e.g. while the platform is in the third vertical platform position, to the target article in the first horizontal direction, at a first vertical repositioning position, e.g. at the target identification tag, such as at the position of the target identification tag on the front target article face. The applied reposition force may be detected. In accordance with the applied reposition force increasing above a force threshold, e.g. if the platform is positioned above the lower target article face, preventing reposition of the target article in the first horizontal direction, the platform may be lowered to a fourth vertical platform position. This process may be performed sequentially a number of times, e.g. until the applied reposition force does not increase above the force threshold, e.g. indicating that the platform has been lowered below the lower target article face, i.e. the platform is not blocking the target article from being repositioned in the horizontal direction. Each time, the platform may be lowered a minimum height. Thus, the fourth vertical platform position may be a multiple number of minimum heights below the third vertical platform position and/or a multiple number of minimum heights below the target identification tag of the target article. In accordance with the applied reposition force being below the force threshold, the target article and the first non-target article may be repositioned, e.g. by the applied reposition force, in the first horizontal direction, such as a first length in the first horizontal direction. The first length may be less than the minimum depth. The first length may be less than 50%, such as less than 40%, such as 30% of the minimum depth. The first length being less than less than the minimum depth may provide that the articles, such as the non-target articles, such as the first non-target article, are kept in engagement, e.g. in a storage rack. Hence, subsequent repositioning, e.g. off the platform may be made easier.

The platform may be positioned in the first vertical platform position by raising the platform until the platform surface is within a predetermined distance of the lower target article face, e.g. after the having repositioning the target article and first non-target article the first length. The predetermined distance may be less than 1 cm, such as less than 0.5 cm. The platform being in the fourth vertical platform position, and the fourth vertical platform position being a position less than the minimum height below the lower target article face, provides that the platform blocks a non-target article, such as the second non-target article, being positioned below the target article. Thus, the target article may be repositioned in the first horizontal direction without repositioning non-target articles below.

One or more non-target articles, such as the first non-target article and/or the third non-target article may be repositioned relative to the target article. For example, the first non-target article and/or the third non-target article may be repositioned, e.g. opposite the first horizontal direction, relative to the target article. The first non-target article and/or the third non-target article may be repositioned relative to the target article after having positioned the platform in the first vertical platform position. The first non-target article and/or the third non-target article may be repositioned relative to the target article before having repositioned the target article and the first non-target article onto the platform. The first non-target article and/or the third non-target article may be repositioned relative to the target article after having repositioned the target article and the first non-target article onto the platform.

Repositioning the first non-target article may comprise applying reposition force, e.g. opposite the first horizontal direction, at a second vertical repositioning position. The second vertical repositioning position may be above the first vertical repositioning position and/or the target identification tag, such as the minimum height above the first vertical repositioning position and/or the target identification tag. Movement of the target article in the first horizontal direction may be detected, e.g. while applying the reposition force at the second vertical repositioning position. In accordance with detection of movement of the target article, reposition force may at the second vertical repositioning position may be ceased. In accordance with detection of movement of the target article, reposition force may be applied, e.g. opposite the first horizontal direction, at a third vertical repositioning position. The third vertical repositioning position may be above the second vertical repositioning position. This process may be performed sequentially a number of times, e.g. until the applied reposition force does not result in movement of the target article, e.g. indicating that the reposition force is applied above the upper target article face. Each time, the vertical repositioning position may be increased the minimum height. Thus, the third vertical repositioning position may be a multiple of the minimum height above the second vertical repositioning position. Increasing the vertical repositioning position by the minimum height may provide that no detection of movement of the target article indicates that the first non-target article is being repositioned. In accordance with no detection of movement of the target article, the first non-target article will be repositioned opposite the first horizontal direction relative to the target article, e.g. by the applied reposition force.

Repositioning the first non-target article opposite the first horizontal direction off the platform may comprise repositioning the first non-target article relative to the target article. For example, repositioning the first non-target article opposite the first horizontal direction off the platform may comprise repositioning the first non-target article such that the front first non-target article face is at a first horizontal stack position, such as an initial horizontal position of the front first non-target article face in the article stack. The first horizontal stack position may be a horizontal position of front faces of articles in the stack, or proposed, such as predetermined, horizontal positions of front faces of articles in the stack.

The robot comprises a repositioning device. The repositioning device may be configured to reposition articles, such as the target article, the first non-target article and/or the third non-target article, e.g. along the first horizontal direction. For example, the repositioning device may comprise an attachment device, such as a suction device, e.g. for low pressure attachment, for attaching to the front face of the article and/or for providing a pulling force, e.g. to provide for the repositioning device to reposition articles in the first horizontal direction. The repositioning device may be configured to provide a pushing force, e.g. to provide for the repositioning device to reposition articles opposite the first horizontal direction.

The repositioning device may be vertically movable. For example, the repositioning device may be vertically movable to provide for providing reposition force at various height, e.g. at various vertical repositioning position, such as the first vertical repositioning position, the second vertical repositioning position, and/or the third vertical repositioning position. The repositioning device may be vertically movable independently or partly independently of the platform. The repositioning device may be vertically movable above the vertical position of the platform.

The robot comprises the platform. The platform has a platform surface. The platform surface may be configured to receive an article, such as the target article. The platform surface may be configured to support a lower face of an article, such as the lower target article face. The platform surface may be planar. The platform surface may be a horizontal plane surface. The platform may comprise optical sensors. The platform surface being within the predetermined distance of a lower article face, such as the lower target article face, may be detected by the optical sensors of the platform. Movement of an article, such as the target article, e.g. in the first horizontal direction, may be detected by the optical sensors. The optical sensors may comprise a plurality of optical sensors, such as a plurality of sets of optical sensors, such as a plurality of optical sensors positioned at a plurality of positions on the platform.

The robot may comprise lateral positioning elements. The platform may comprise the lateral positioning elements. The lateral positioning elements may be configured to displace an element, such as the target element, along the second horizontal direction. For example, the lateral positioning elements may be used to position an element on the platform for insertion into a rack.

The platform is vertically movable. The platform may be positioned in positions between a lower vertical platform position and an upper vertical platform position, such as in the first vertical platform position, the second vertical platform position, the third vertical platform position and/or the fourth vertical platform position.

The robot may comprise a base. The base may comprise one or more wheels, such as a plurality of wheels, such as a first wheel, a second wheel and/or a third wheel. One or more of the one or more wheels, such as the first wheel and/or the second wheel, may be separately driven and/or controlled. For example, the robot may be differentially steered. Alternatively or additionally, one or more of the one or more wheels may be ommi wheels.

Alternatively or additionally, one or more of the one or more wheels, such as the first wheel and/or the second wheel, may be steerable. The one or more of the one or more wheels, such as the first wheel and/or the second wheel, may be controllably rotatable about a substantially vertical axis, e.g. to steer the robot. The one or more of the one or more wheels, such as the first wheel and/or the second wheel, may be individually rotatable about the vertical axis. The one or more of the one or more wheels, such as the first wheel and/or the second wheel, may be rotatable more than 90 degrees, such as more than 135 degrees, such as more than 180 degrees, such as 360 degrees, about the vertical axis. Steerable wheels may facilitate a base that is smaller in at least one direction, as the need for rotation at positions with limited space may be reduced. Consequently, the robot may be able to work in environments with less space.

The robot may comprise a vertical element. The vertical element may extend from the base. The vertical element may be a telescopic element. The vertical element may comprise a first vertical element part and a second vertical element part. The second vertical element part may be vertically movable relative to the first vertical element part. The platform and/or the repositioning device may be attached to the vertical element, such as the second vertical element part. The platform and/or the repositioning device may be vertically movable along the vertical element. The repositioning device may be arranged above the platform. The repositioning device may be vertically movable above the platform.

The robot may comprise a vertical positioning system, e.g. for vertically positioning the platform and/or repositioning device. The vertical element may comprise the vertical positioning system. The vertical positioning system may be configured to vertically move the second vertical element part relative to the first vertical element part.

The robot may comprise a cable reel system, e.g. configured to take up excess cable, e.g. of a cable connecting the platform and/or repositioning device with component of the base. The vertical element may comprise the cable reel system.

The cable reel system may comprise a sliding element. The sliding element may comprise a first slide pully and/or a second slide pully. The sliding element may be vertically movable along the vertical element. A spring element may be attached to the sliding element. The spring element may bias the sliding element in a downward direction. The spring element may bias the sliding element such that it tightens excess cable.

Alternatively or additionally, the cable reel system may comprise a reel, such as a reel for winding up excess cable, such as a cable drum. The reel may be spring biased to automatically wind up excess cable. The reel may be spring biased to provide tension, such as predefined tension to the cable.

The robot may comprise an identification device. The identification device may be configured to identify an identification tag, such as the identification tag of an article, such as the target identification tag. The identification device may be configured to identify a number, a bar code, an RFID tag, an NFC tag and/or other exemplary identification tags.

The identification device may be positioned on the platform, e.g. at the side of the platform. Positioning the identification device on the side of the platform may enable identification of the articles while passing by article stacks. The identification device may be provided on the repositioning device, e.g. the repositioning device may comprise the identification device. The identification device may be used to identify the position, e.g. horizontal and/or vertical position, of an identification tag. Identification of the position of the identification tag may provide the advantage that the identification tag may represent a part of the front target article face suitable for attachment of the repositioning device. For example, the repositioning device may rely on low pressure for attaching to the front target article face and the identification tag, such as a bar code, may be known to form a substantially plane surface.

The robot may be configured to move, such as to move around in the storage facility. The robot may be configured to position the base in a position relative to the article stack, such as the article stack comprising the target article.

The robot may be configured to navigate, such as automatically navigate, around in the storage facility. For example, the robot may comprise a navigation sensor. The navigation sensor may comprise wireless transmitters and/or receivers for communicating with transmitters/receivers positioned at fixed points in the storage facility.

The robot may be configured to perform routine scans of the plurality of articles in the storage facility. For example, the robot may be configured to identify all articles in the storage facility each night, and/or to map articles of each article stack in the storage facility. The robot may be configured to determine the position relative to the article stack based on storage article positions obtained by the routine scans. For example, when the robot is requested to retrieve a target article, the robot may determine the article stack comprising the target article based on storage article positions obtained by the routine scans, such as the last performed routine scan. Subsequently, the robot may position itself, such as the base of the robot, relative to the article stack, such as in front of the article stack.

Any feature described above in relation to any one aspect of the disclosure is applicable also to any other aspect of the disclosure, mutatis mutandis.

BRIEF DESCRIPTION OF THE FIGURES

FIG. 11 schematically illustrates an exemplary vertical positioning system.

Embodiments of the invention will be described in more detail in the following with regards to the accompanying figures. The figures show one way of implementing the present invention and are not to be construed as being limiting to other possible embodiments falling within the scope of the attached claim set.

DETAILED DESCRIPTION

Figure 1:
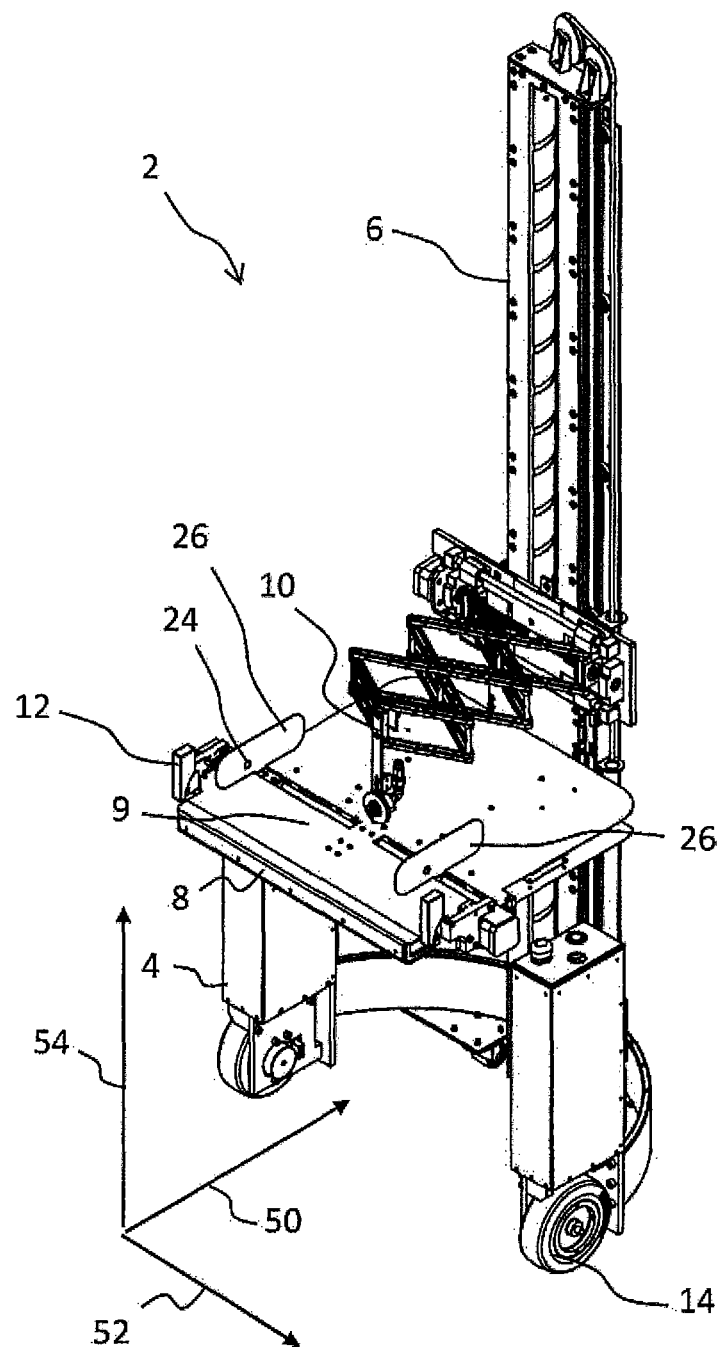
FIG. 1 schematically illustrates an exemplary robot.

FIG. 1 schematically illustrates an exemplary robot 2, e.g. for retrieval of a target article from an article stack. The robot 2 comprises a base 4, a vertical element 6, a platform 8, a repositioning device 10, and an identification device 12.

The platform 8 is vertically movable, i.e. along a vertical direction 54. The platform 8 is vertically movable along the vertical element 6. The platform 8 has a platform surface 9. The platform 8 comprises optical sensors 24. The optical sensors provide for detection of articles situated on the platform surface 9 and/or for detection of movement of articles situated on the platform surface 9.

The repositioning device 10 is vertically movable, i.e. along the vertical direction 54. The repositioning device 10 is vertically movable along the vertical element 6, e.g. above the platform 8. The repositioning device 10 is extendable and retractable along a first horizontal direction 50. A second horizontal direction 52 being perpendicular to the first horizontal direction 50 is also shown. The repositioning device 10 is configured to reposition articles on and off the platform 8, e.g. along the first horizontal direction 50. The repositioning device 10 may extend to reposition, e.g. to push, an article off the platform 8 opposite the first horizontal direction. The repositioning device 10 may attach to an article and retract to reposition, e.g. to pull, the article onto the platform 8 in the first horizontal direction.

The identification device 12 may be a bar code reader, an RFID reader, an NFC reader and/or other exemplary identification tag reader. The identification device 12 is positioned on the platform 8, e.g. at the side of the platform 8, such as to enable identification of the articles while passing by article stacks. The identification device 12 may be used to identify the position, e.g. horizontal and/or vertical position of an identification tag. Alternatively or additionally, the identification device 12 may be positioned on the repositioning device 10, e.g. at the tip of the repositioning device 10.

The robot 2 comprises wheels 14. The base 4 may comprise the wheels 14. The wheels may provide for movability of the robot 2. The wheels 14 may provide for steering of the robot 2. For example, the wheels 14 may be steerable and/or the wheels 14 may be differentially controlled.

The robot 2 comprises optional lateral positioning elements 26. The platform 8 may comprise the lateral positioning elements 26. The lateral positioning element 26 may be configured to displace an element, such as the target element, along the second horizontal direction 52.

Figure 2:
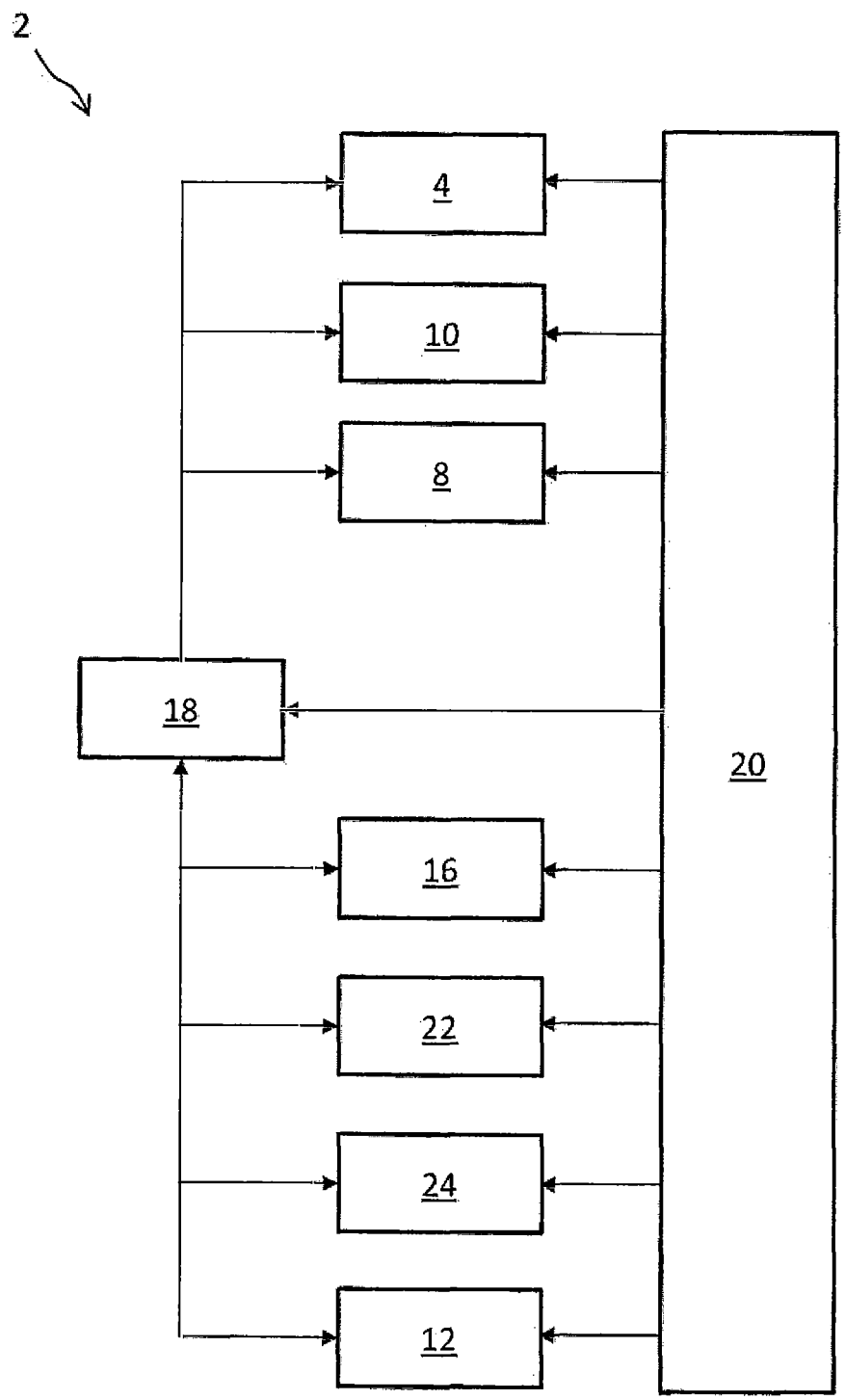
FIG. 2 shows a simplified block diagram of an exemplary robot.

FIG. 2 shows a simplified block diagram of an exemplary robot 2, such as the robot as described in relation to FIG. 1. The robot 2 comprises a base 4, a platform 8, a repositioning device 10, an identification device 12, a navigation sensor, a force sensor 22, and optical sensors 24. The robot 2 comprises a battery 20 configured to power the electronic components of the robot 2.

The robot 2 comprises a processing unit 18. The processing unit 18 is configured to receive sensor signals from sensors, such as the identification device, the navigation sensor, the force sensor 22 and the optical sensor 24. The processing unit 18 is configured to control the components of the robot. The processing unit 8 may control the components based on sensor signals received from one or more of the sensors.

The processing unit 8 may be configured to control the base 4 to position the robot 2 in a desired position.

The processing unit 8 may be configured to control the platform 8 to position the platform 8 in a desired vertical platform position.

The processing unit 8 may be configured to control the repositioning device 10 to position the repositioning device 10 in a desired vertical repositioning position. The processing unit 8 may be configured to control the repositioning device 10 to reposition an article, such as the target article, such as to push or pull an article at the vertical repositioning position.

Figure 3:
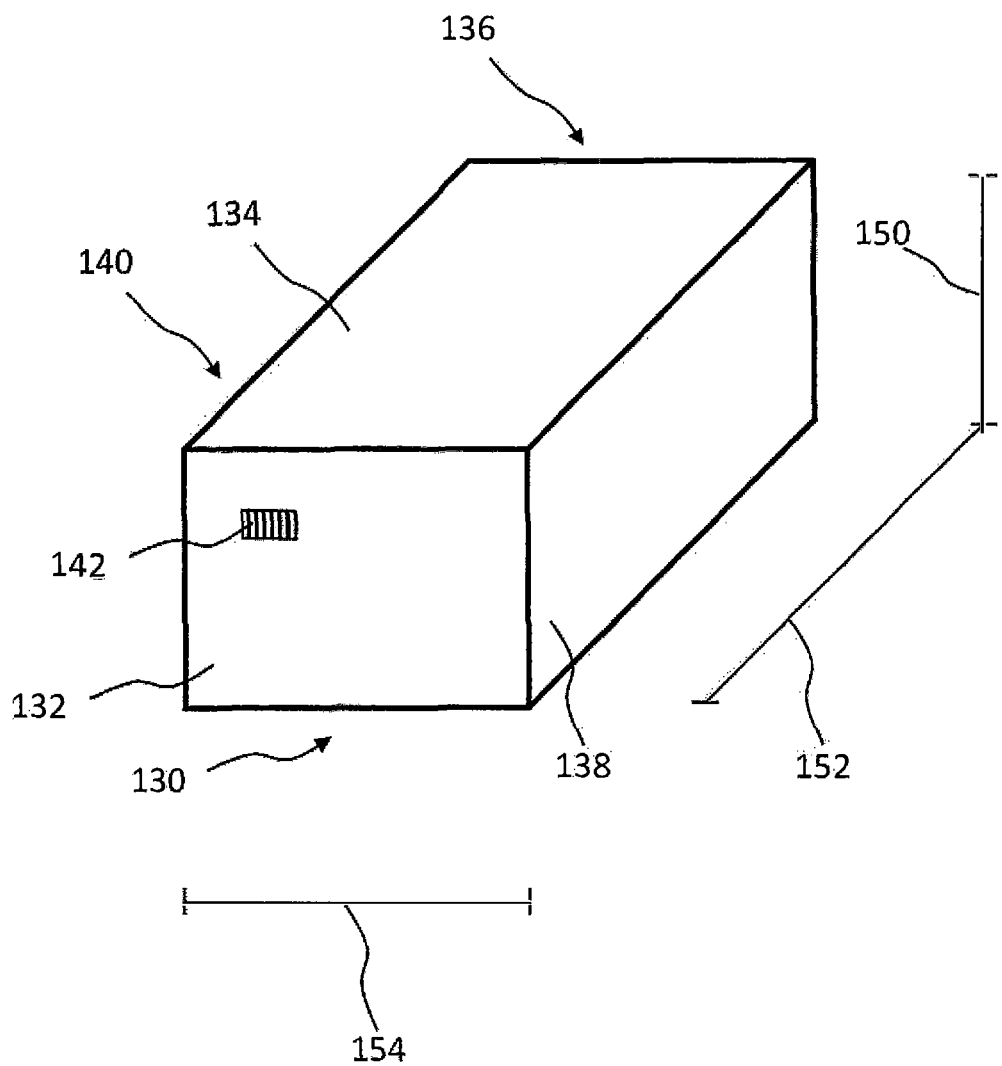
FIG. 3 schematically illustrates an exemplary article.

FIG. 3 schematically illustrates an exemplary article, such as a target article 114, a first non-target article 116, a second non-target article 118, or another article.

The article 114, 116, 118 is a six-sided box. The article 114, 116, 118 comprises a lower face 130, a front face 132, an upper face 134, a back face 136, a first side face 138, and a second side face 140. The article 114, 116, 118 has article height 150, an article depth 152, and an article width 154.

The article 114, 116, 118 comprises an identification tag 142. The identification tag 142 may be used to identify, such as uniquely identify, the article 114, 116, 118. The identification tag 142 may be a number, a bar code, an RFID tag, an NFC tag and/or other exemplary identification tags. The identification tag 142 may be positioned on the front face 132, as illustrated.

Figure 4A:
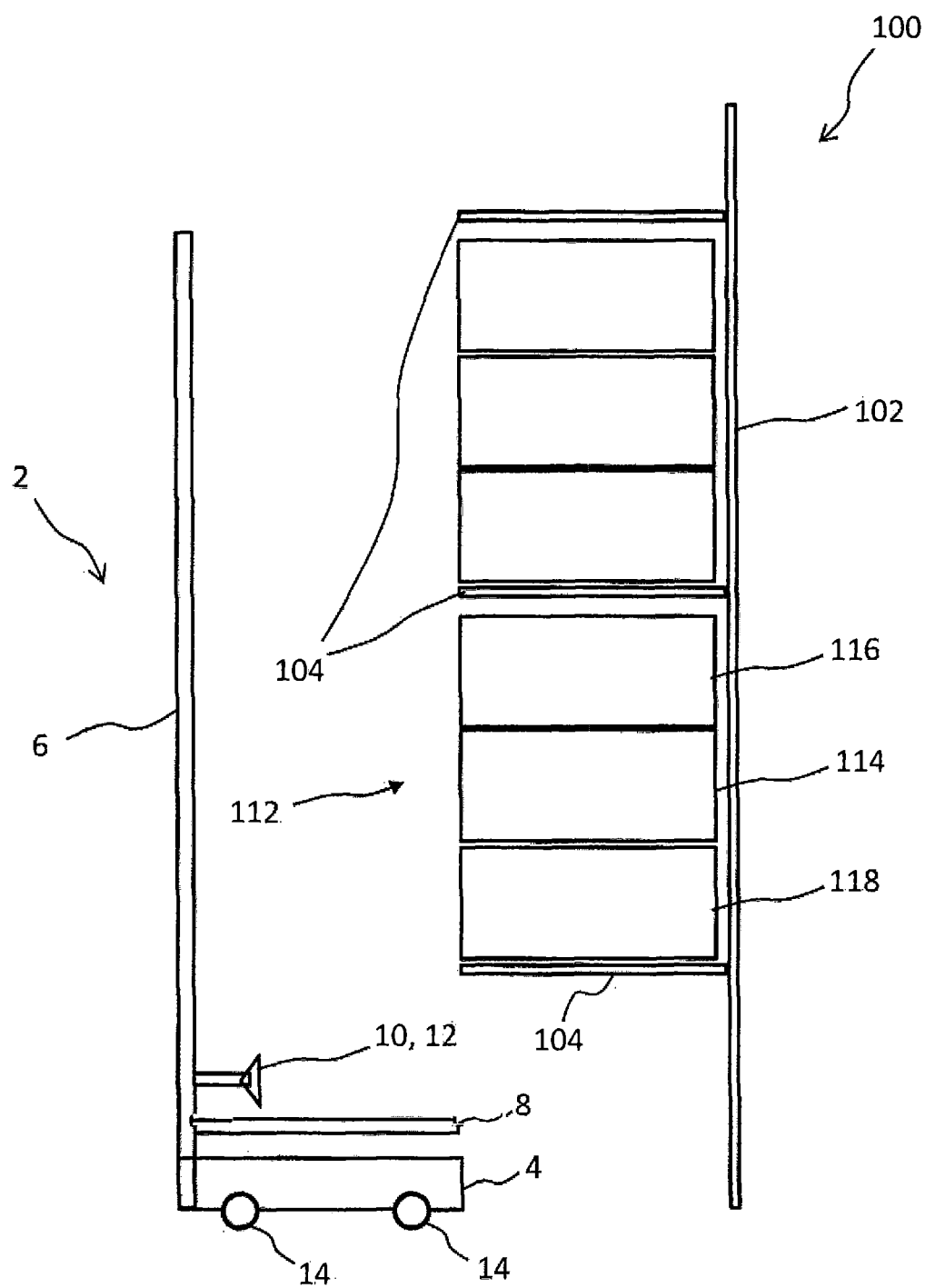
FIG. 4*a-n* schematically illustrates an exemplary step by step process of retrieval of an article by an exemplary robot.
Figure 4B:
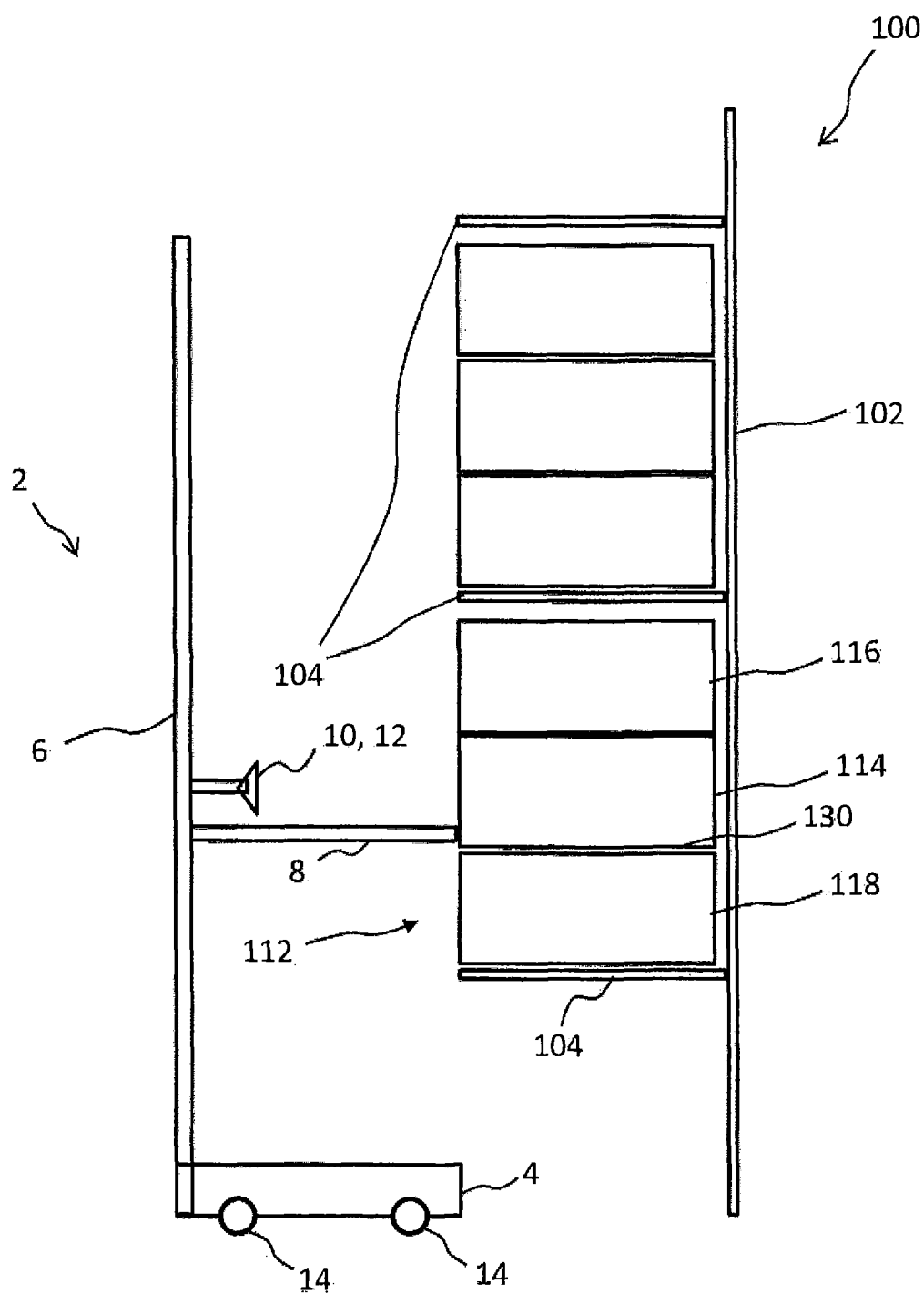
Figure 4C:
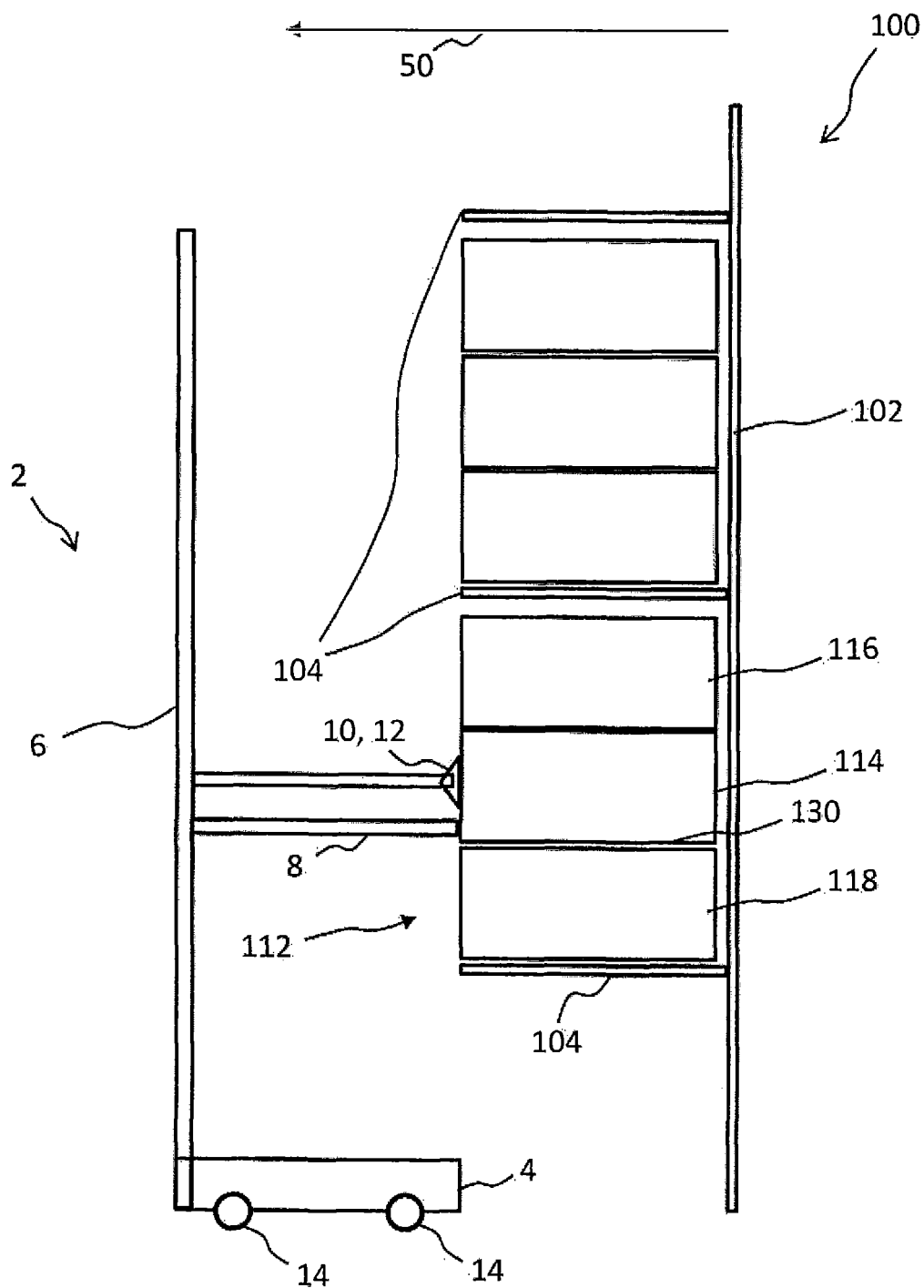
Figure 4D:
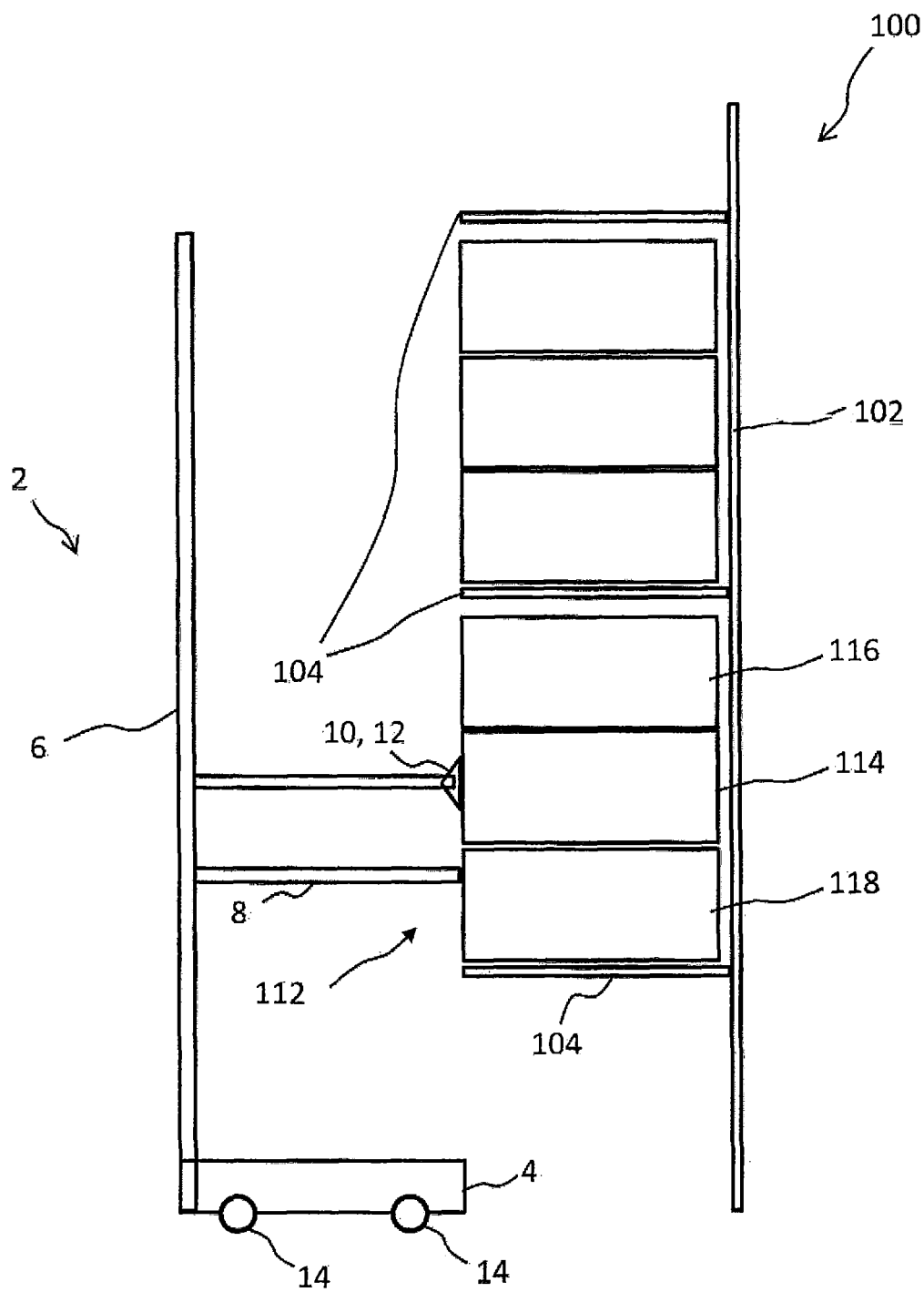
Figure 4E:
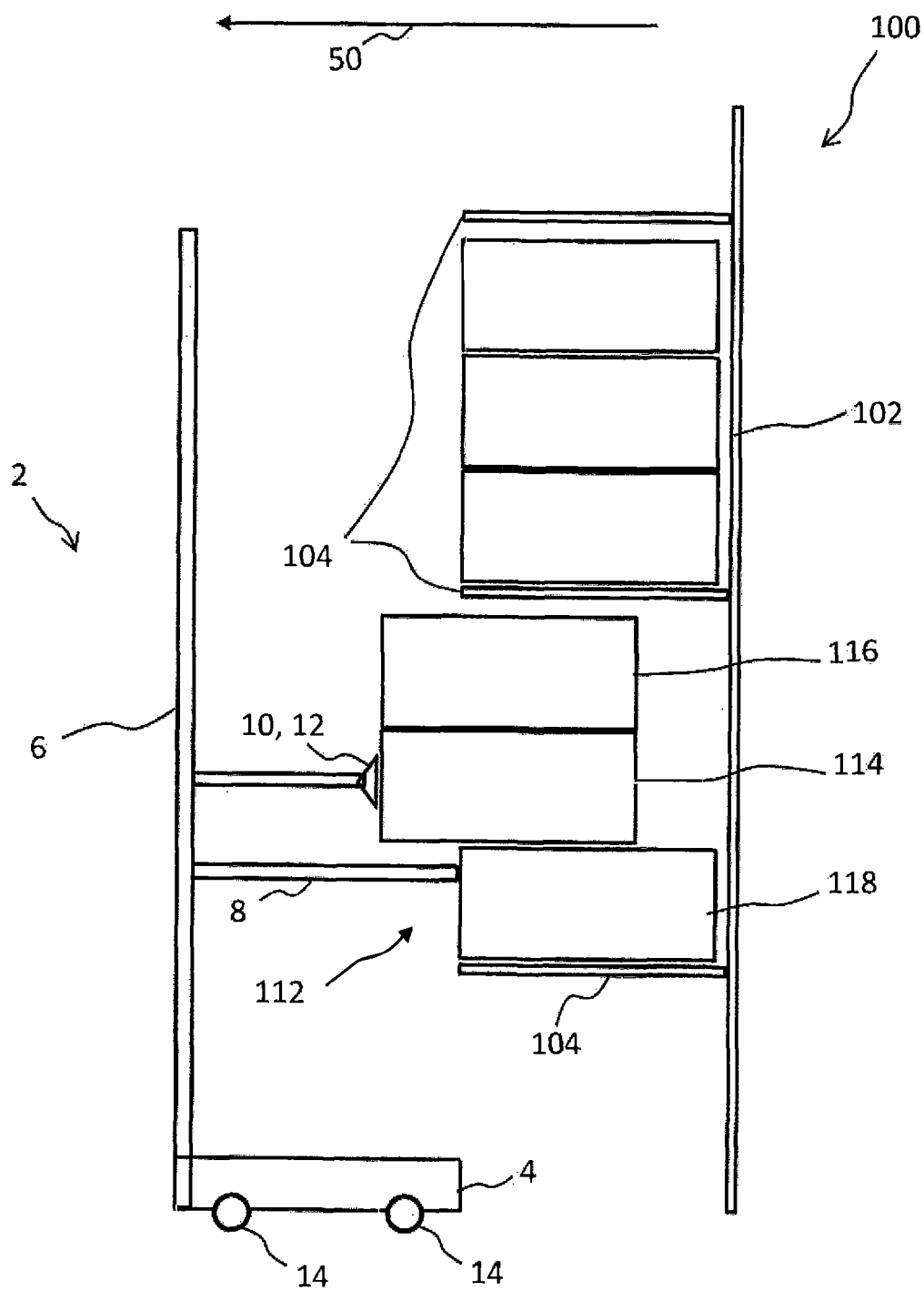
Figure 4F:
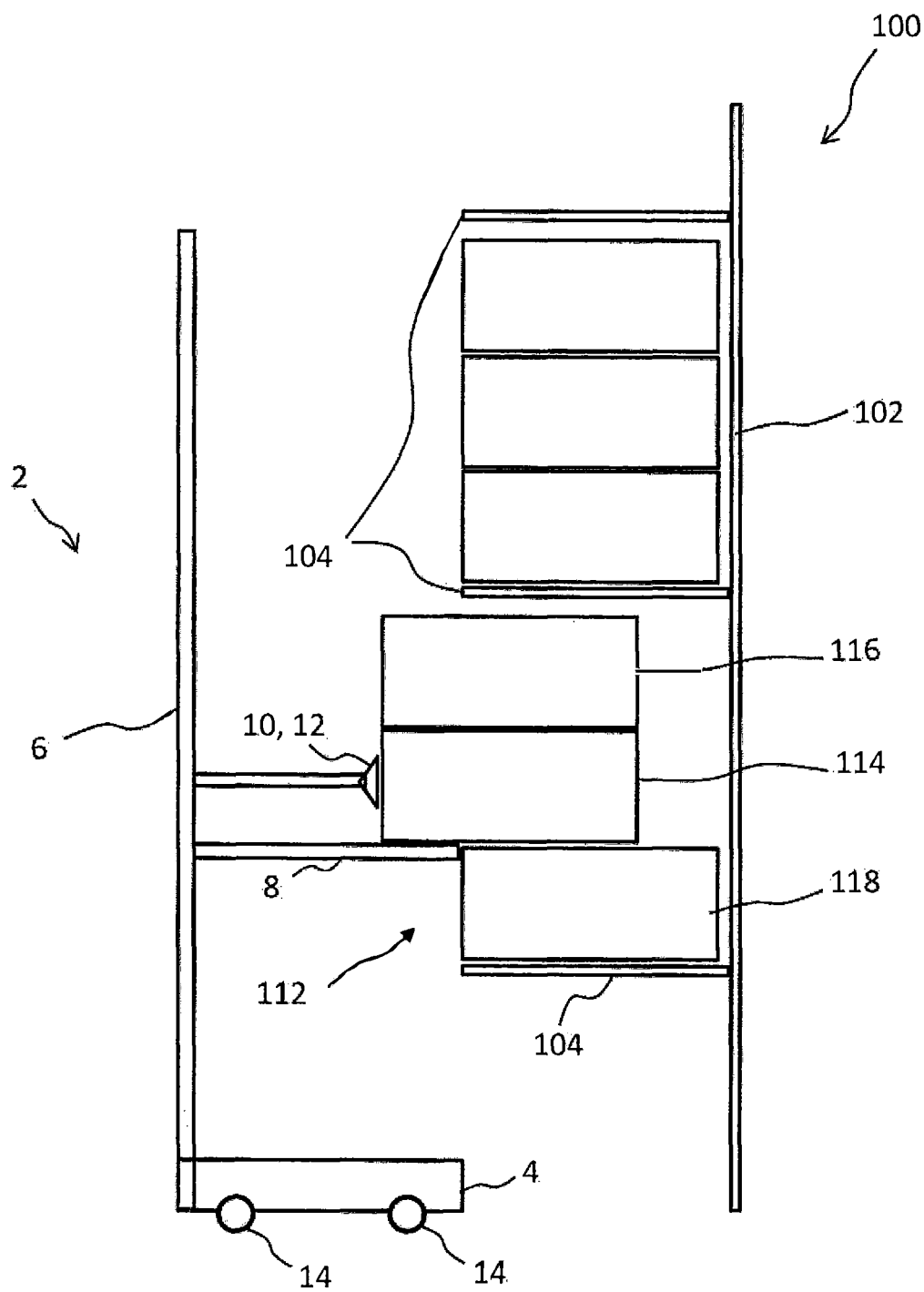
Figure 4G:
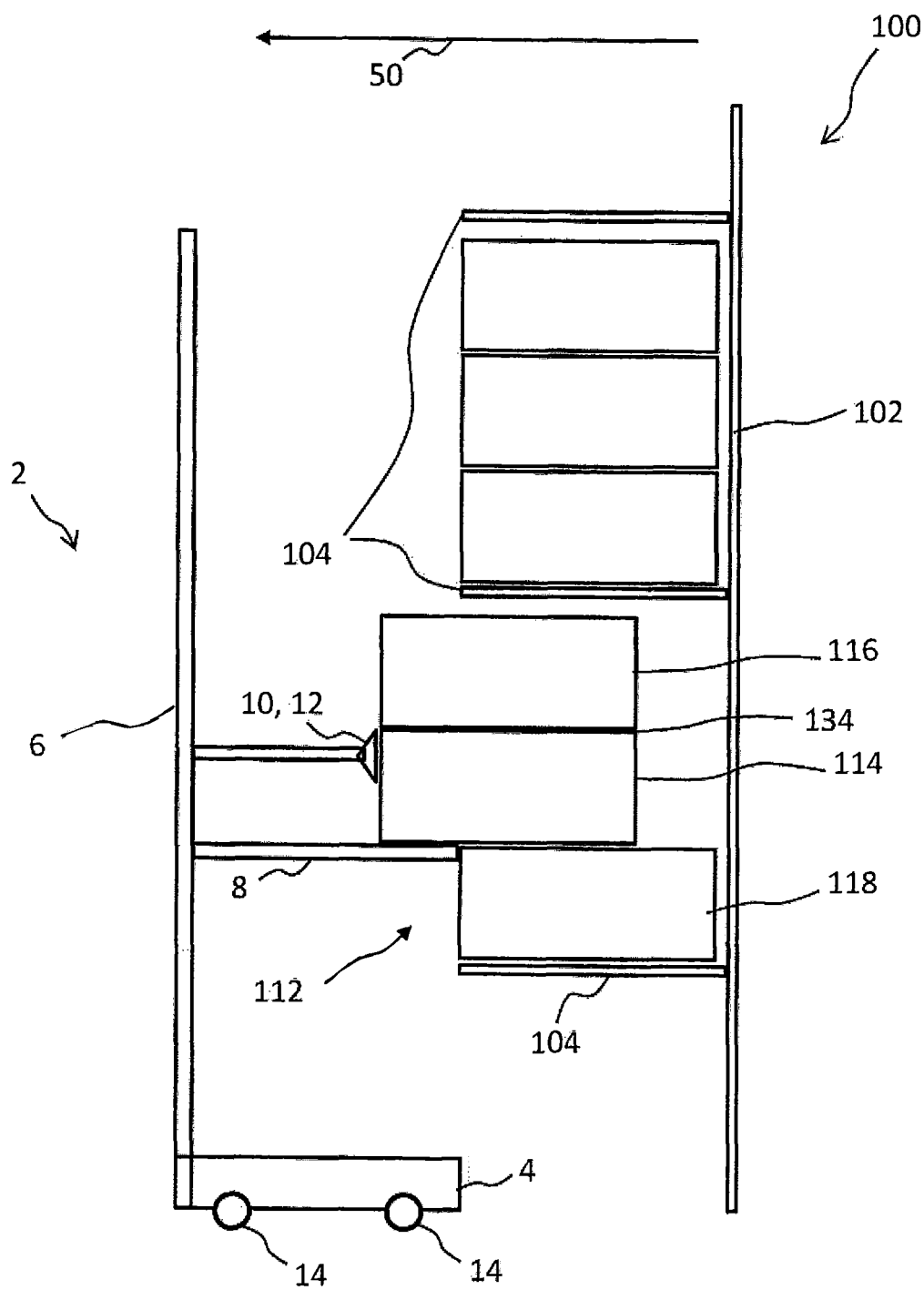
Figure 4H:
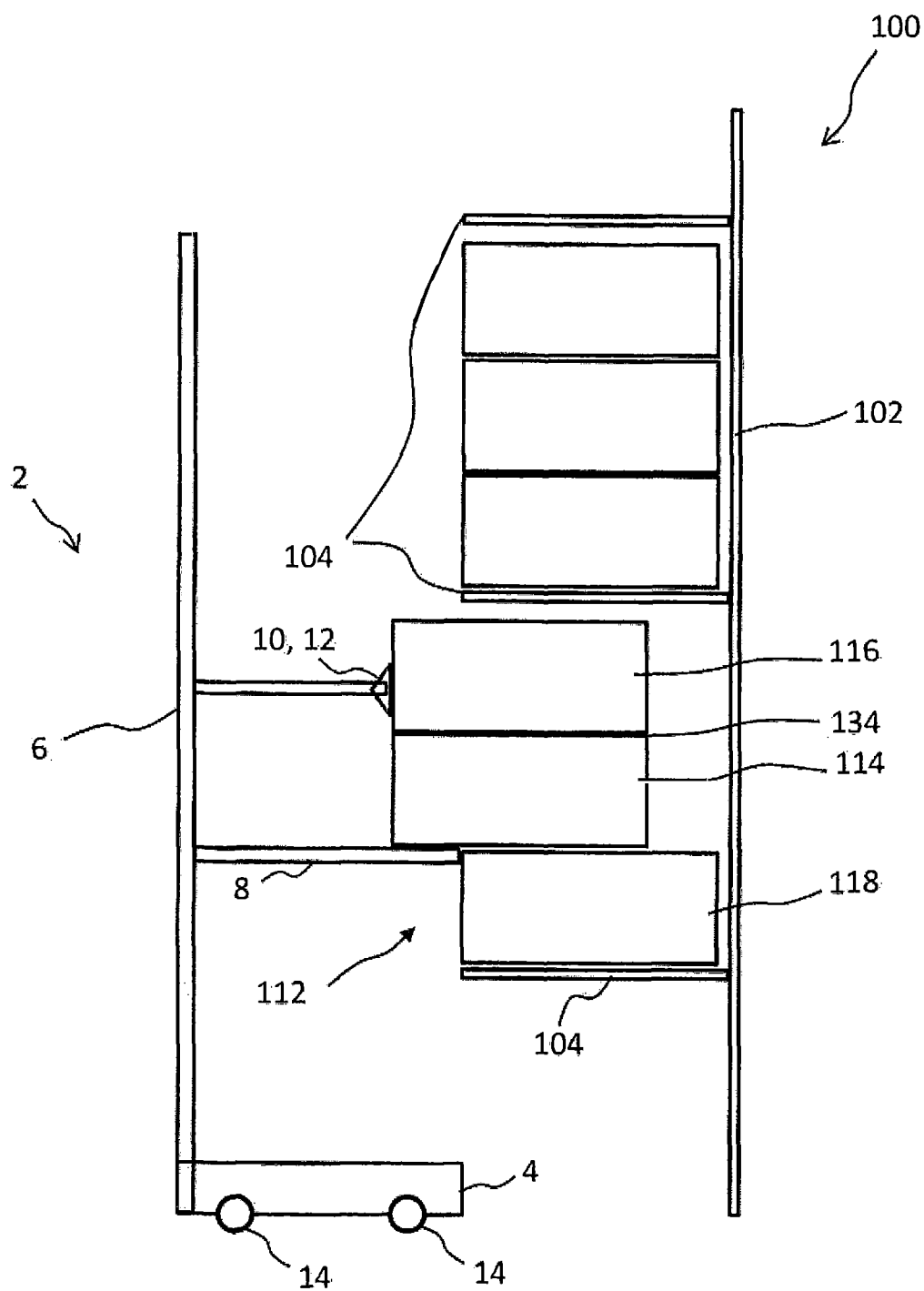
Figure 4I:
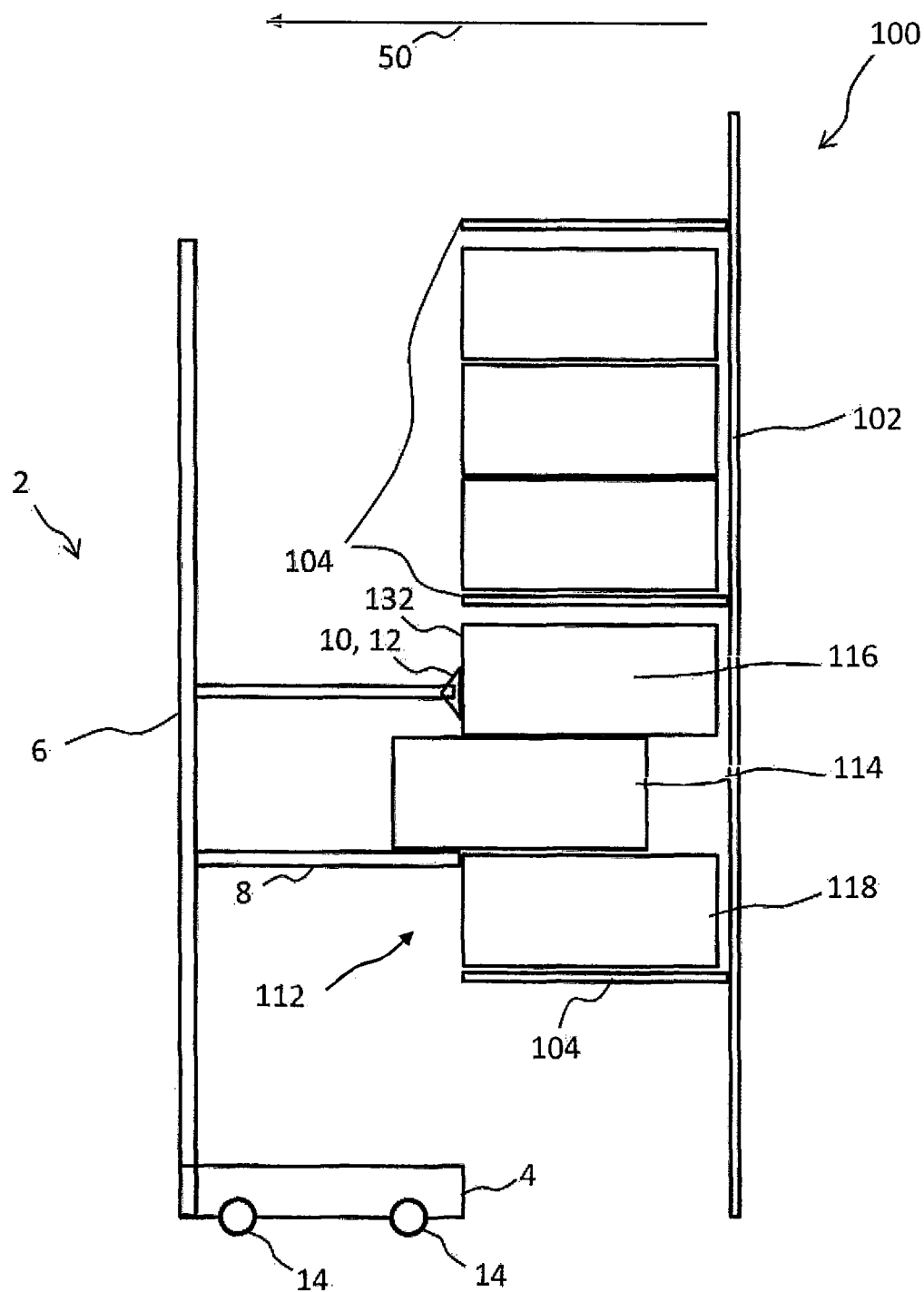
Figure 4J:
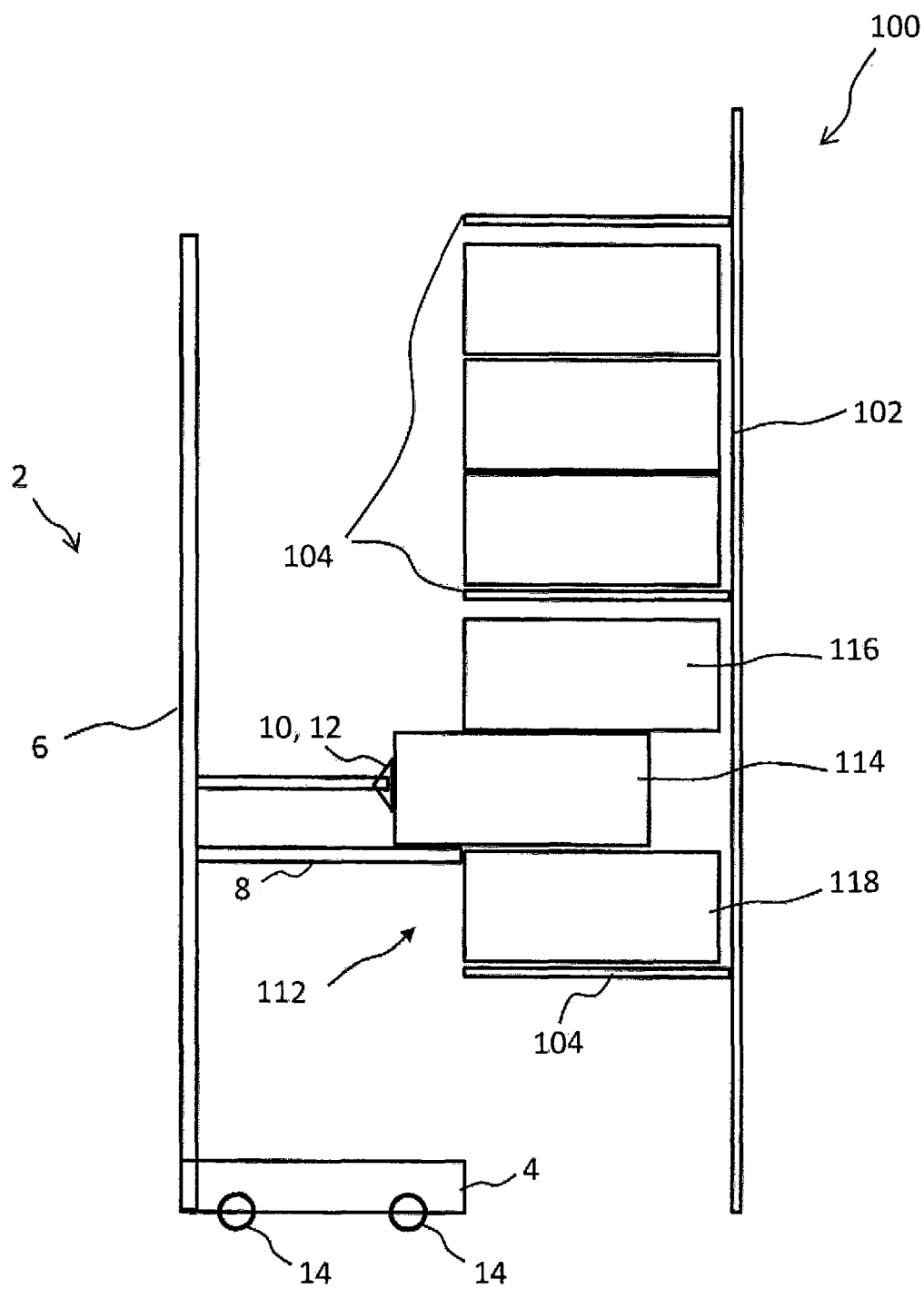
Figure 4K:
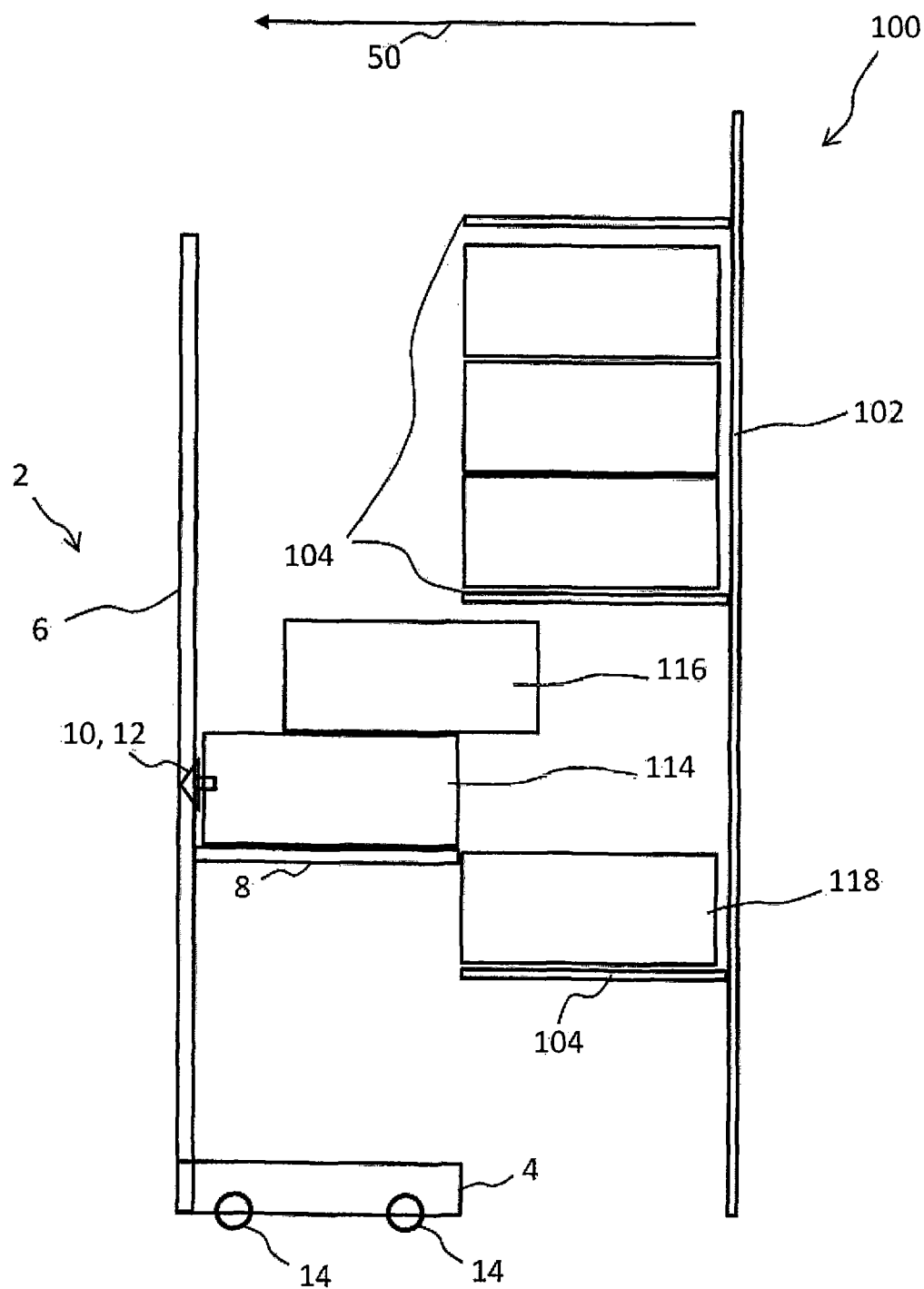
Figure 4L:
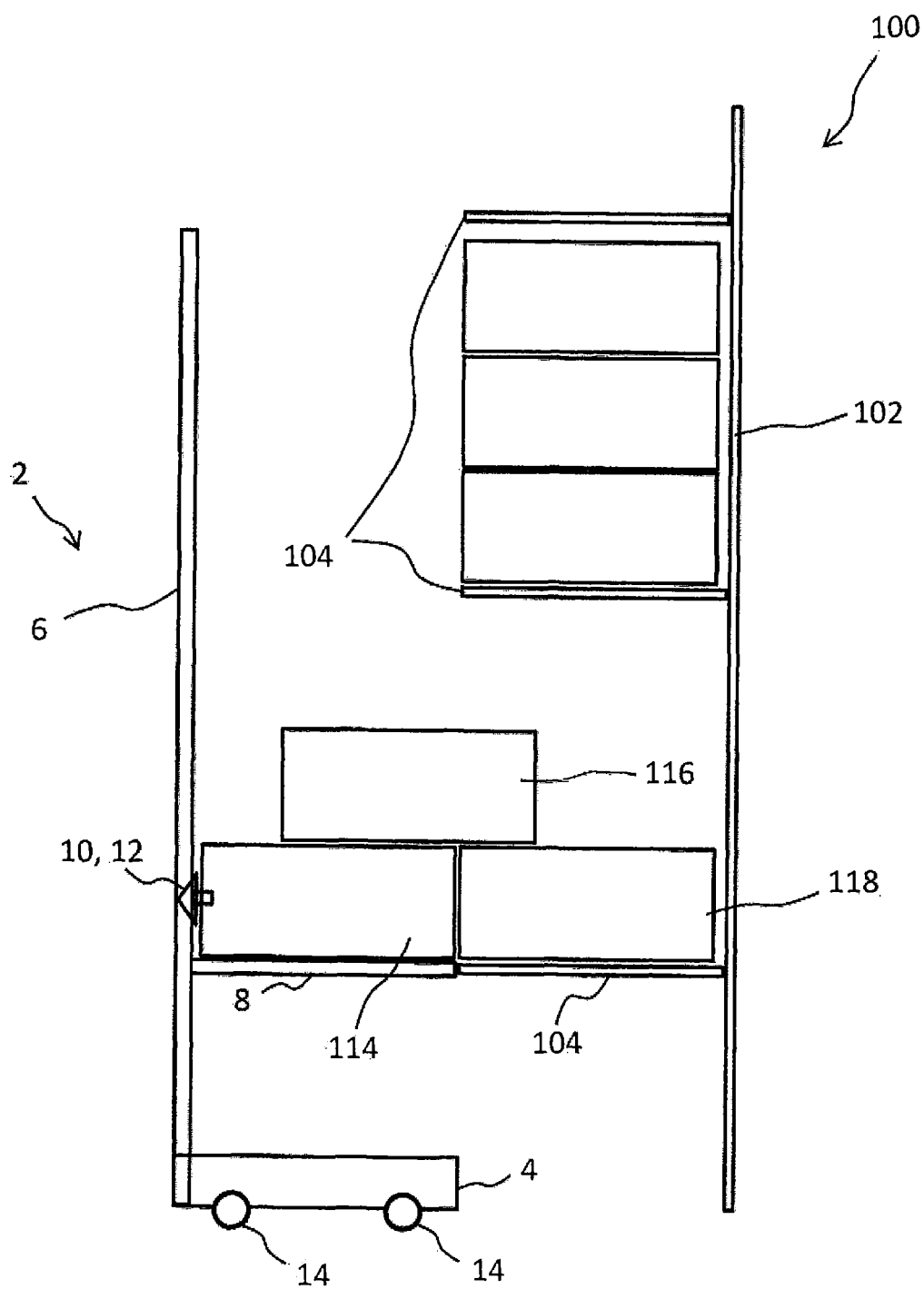
Figure 4M:
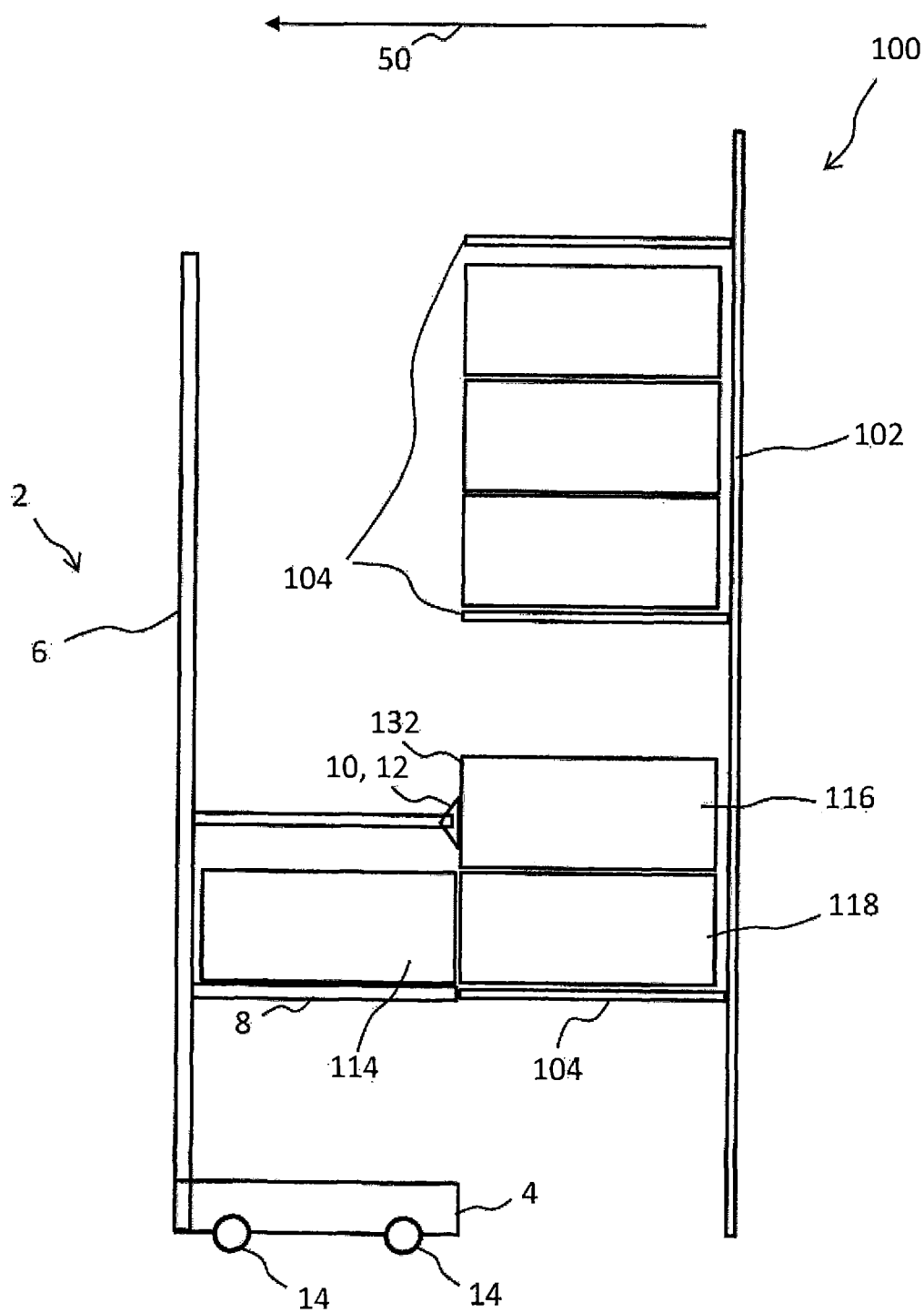
Figure 4N:
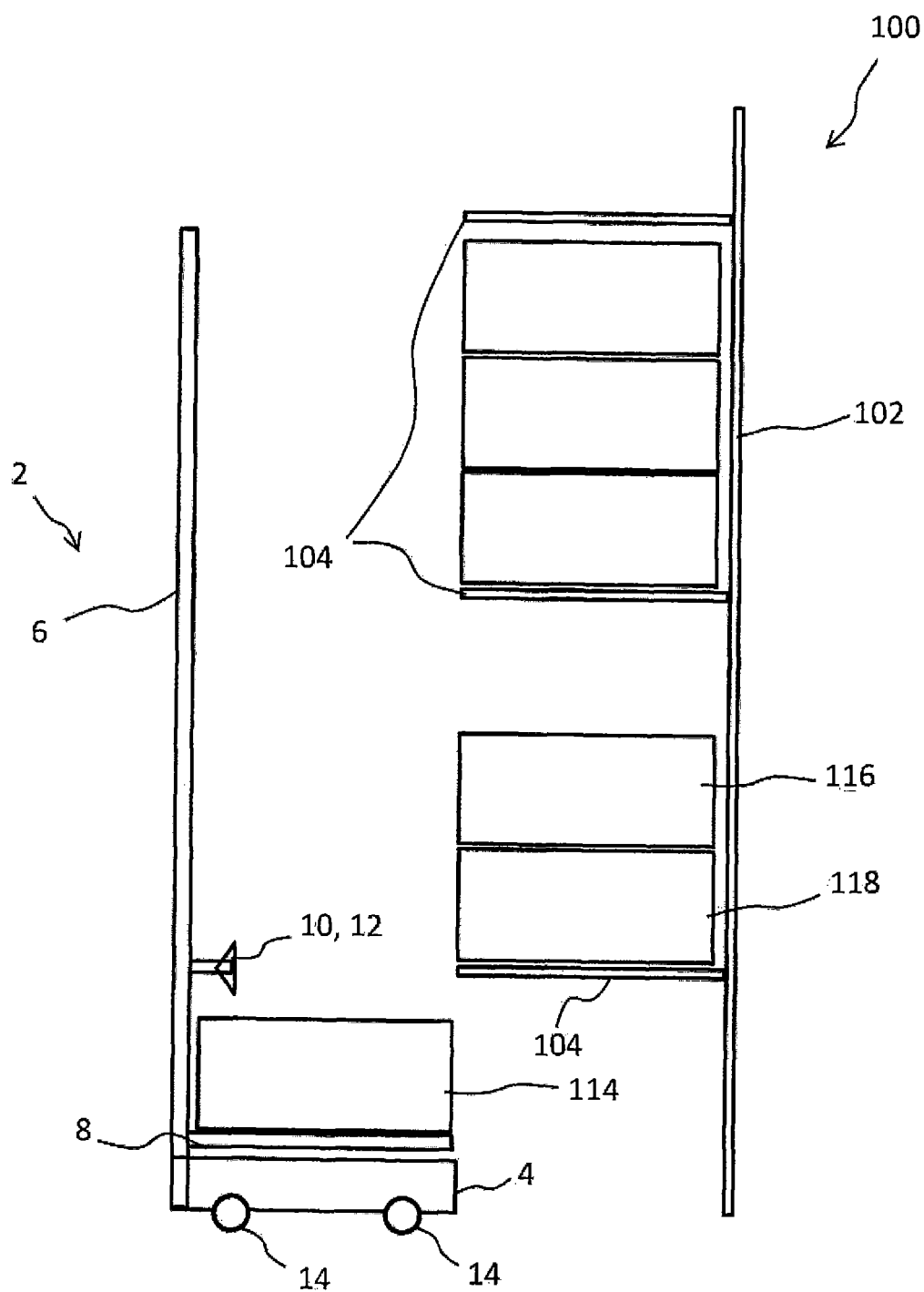

FIG. 4a-n schematically illustrates an exemplary step-by-step process of retrieval of a target article 114 by an exemplary robot 2.

The robot 2 comprises a base 4 with wheels 14, a platform 8, a repositioning device 10 and an identification device 12. The platform 8, the repositioning device 10 and the identification device 12 are attached to a vertical element 6, and vertically movable.

The target article 114 is positioned in an article stack 112 comprising the target article 114, a first non-target article 116 and a second non-target article 118. The articles are located in a storage facility 100 comprising storage racks 102. The storage racks 102 comprises storage shelves 104. Article stacks, such as the article stack 112 comprising the target article 114, are provided on the storage shelves 104.

FIG. 4a illustrates the robot 2 being positioned relative to the article stack 112, such as in front of the article stack 112.

FIG. 4b illustrates the platform being positioned in a third vertical platform position. The repositioning device 10 is positioned at a first vertical repositioning position, e.g. corresponding to a vertical position of an identification tag of the target article 114. The third vertical platform position may be a minimum height of an article below the vertical position of the identification tag. In the illustrated example, the third vertical platform position is above the lower target article face 130.

FIG. 4c illustrates that the repositioning device 10 is brought in contact with the target article 114, such as to be attached to the target article 114. The repositioning device 10 is applying reposition force to the target article 114 in the first horizontal direction 50 at the first vertical repositioning position, e.g. corresponding to the vertical position of the identification tag of the target article 114.

The applied reposition force is detected, e.g. by a force sensor in the repositioning device 10. Because in the illustrated example, the third vertical platform position is above the lower target article face 130, the platform 8 is blocking the repositioning of the target article 114, and the reposition force will increase above a force threshold.

FIG. 4d illustrates that the platform 8 has been lowered to a fourth vertical platform position in response to the reposition force increasing above the force threshold, such as a vertical platform position wherein the platform is no longer blocking the repositioning of the target article 114.

In the illustrated example, the third vertical platform position, as illustrated in FIG. 4b, was above the lower target article face 130. In case the third vertical platform position would be below the lower target article face 130, the situation as illustrated in FIG. 4d would have occurred without preforming the step as explained in FIG. 4c, and the third vertical platform position would be the fourth vertical platform position.

FIG. 4e illustrates that the target article 114 and the first non-target article 116 is repositioned in the first horizontal direction 50. The target article 114 and the first non-target article 116 is repositioned a first length in the first horizontal direction, such as ⅓ of a minimum length of an article. The platform 8 is in a vertical platform position, such as the third vertical platform position and/or the fourth vertical platform position, wherein the platform 8 is preventing the second non-target article 118 from being repositioned in the first horizontal direction 50.

FIG. 4f illustrates that the platform 8 is raised to a first vertical platform position. The first vertical platform position may be a position of the platform wherein the target article 114 is resting on the platform surface of the platform 8, as illustrated. The first vertical platform position may be a position of the platform 8 wherein the distance between the target article 114 and the platform surface is less than a predetermined distance. The platform 8 being in the first vertical platform position may be detected by sensors, such as optical sensors provided on the platform 8.

FIG. 4g illustrates that the repositioning device 10 is raised to a second vertical repositioning position, e.g. a minimum height of an article above the first vertical repositioning position. Raising a minimum height ensures, ensuring that the repositioning device 10 is not raised to a position allowing an entire article to be between the first vertical repositioning position and the second vertical repositioning position.

Reposition force is applied by the repositioning device 10 opposite the first horizontal direction 50 at the second vertical repositioning position. Because the second vertical repositioning position is not above the upper target article face 134, as illustrated, the applied reposition force will result in reposition of the target article 114 opposite the horizontal direction 50. The movement of the target article 114 is detected, and the repositioning device 10 may cease to apply reposition force at the second vertical repositioning position.

FIG. 4h illustrates that the repositioning device 10 is raised in response to the detected movement of the target article 114. The repositioning device 10 is raised to a third vertical repositioning position, e.g. a minimum height of an article above the second vertical repositioning position.

Reposition force is applied by the repositioning device 10 opposite the first horizontal direction 50 at the third vertical repositioning position. As illustrated, applying the reposition force at the third vertical repositioning position will result in reposition of the first non-target article 116. In case, movement of the target article 114 was still detected, e.g. if the repositioning device 10 was still below the upper target article face 134, the repositioning device 10 would be raised again, e.g. until the reposition force is applied to the first non-target article 116.

FIG. 4i illustrates that the first non-target article 116 has been repositioned relative to the target article 114 by the repositioning device 10 applying the reposition force at the third vertical repositioning position. The robot 2 may be configured to reposition the non-target article 116 to a position wherein the front first non-target article face 132 is in a predetermined horizontal position, such as to align the front faces of the articles in the rack 102.

FIG. 4j illustrates that the repositioning device 10 is again positioned to attach to the target article 114, e.g. at the first vertical repositioning position. The repositioning device 10 applies repositioning force in the first horizontal direction 50 to the target article 114 to reposition the target article 114 and the first non-target article 116 in the first horizontal direction 50. FIG. 4k illustrates that the target article 114 and the first non-target article 116 has been repositioned in the first horizontal direction 50 onto the platform.

FIG. 4l illustrates that the platform 8 is positioned, such as lowered, to a second vertical platform position. The second vertical platform position may be below the first vertical platform position, such as the height of the target article 114 below the first vertical platform position. The height of the target article 114 may be determined by sensors, such as optical sensors, e.g. after the first non-target article 116 was repositioned relative to target article 114 as. Alternatively, the platform 8 may be equipped with load sensors detecting configured to detect when the first non-target article 116 is being partly supported by the second non-target article 118. Thereby detecting when the platform has reached the second platform position.

FIG. 4m illustrates that the repositioning device 10 is repositioning the first non-target article opposite the first horizontal direction off the platform, such as back in storage rack 102. The first non-target article may be repositioned to a position wherein the front first non-target article face 132 is in a predetermined horizontal position, such as to align the front faces of articles in the rack 102.

Hereafter the target article 114 has been retrieved and the first non-target article 116 previously sitting on top of the target article 114 is positioned back into the rack 102, without any of the articles being tilted or having fell.

FIG. 4n illustrates that the platform 8 with the target article 114 has been positioned, such as lowered, to a transport position. The robot 2 may continue to retrieve another article onto the top of the target article 114, before delivering the retrieved articles to a delivery point.

Figure 5:
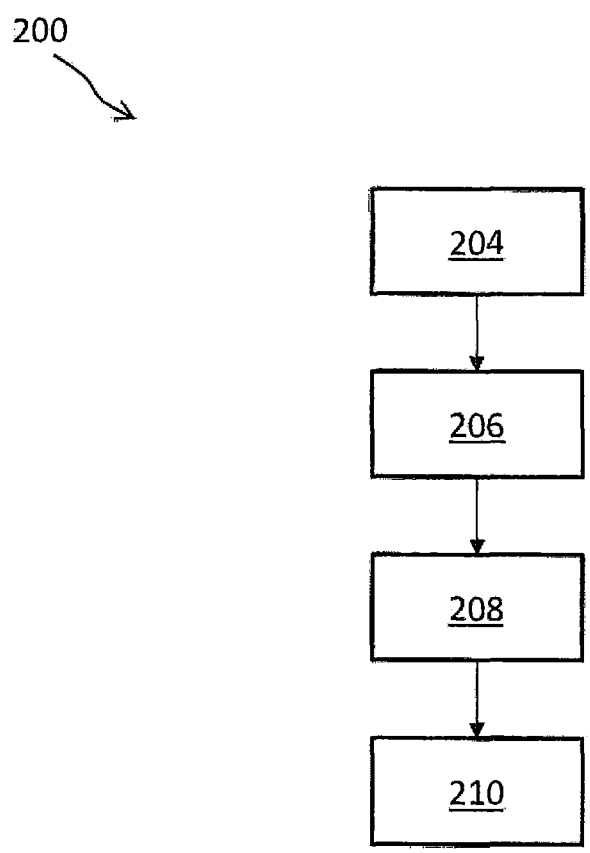
FIG. 5 shows a flow chart of an exemplary method.

FIG. 5 shows a flow chart of an exemplary method 200, such as a method for retrieval of a target article from an article stack. The article stack comprising the target article and a first non-target article being positioned on top of the target article. The target article being arranged in the article stack with a lower target article face being at a first vertical stack position. The method 200 comprises: identifying 204 the target article; positioning 206 a platform having a platform surface in a first vertical platform position (see e.g. FIG. 4b-f); repositioning 208 the target article and the first non-target article in a first horizontal direction onto the platform (see e.g. FIG. 4j-k); and repositioning 210 the first non-target article opposite the first horizontal direction off the platform (see e.g. FIG. 4m).

Identifying 204 the target article may comprise identifying an identification tag of the target article. The identification tag may be positioned on a front target article face. The identification tag may be a number, a bar code, an RFID tag, an NFC tag and/or other exemplary identification tags.

Positioning 206 the platform in the first vertical platform position may provide the platform surface being at the first vertical stack position or below the first vertical stack position. Repositioning 208 the target article and the first non-target article in a first horizontal direction onto the platform may provide that the target article and all articles sitting on top of the target article, such as the first non-target article is removed from the article stack and onto the platform. The target article is the lowest article of the articles removed onto the platform.

Repositioning 210 the first non-target article opposite the first horizontal direction off the platform may provide that all articles sitting on top of the target article, such as the first non-target article is removed from the platform and back into the article stack. Afterwards, the target article is remaining on the platform.

Figure 6:
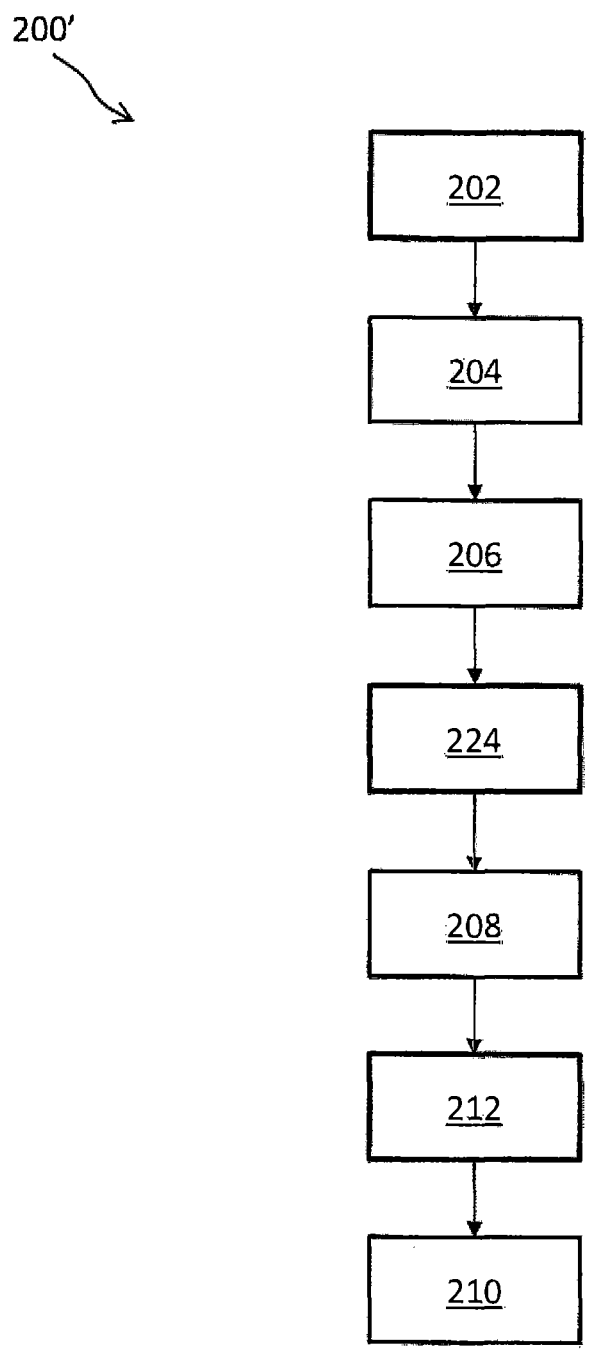
FIG. 6 shows a flow chart of an exemplary method.

FIG. 6 shows a flow chart of an exemplary method 200'. The method 200' comprises the same steps as the method 200 of FIG. 5. However, the method 200' comprises additional steps.

The method 200' comprises positioning 202 the platform and/or a robot comprising the platform and/or a base of a robot comprising the platform relative to the article stack (see e.g. FIG. 4a).

The method 200' comprises repositioning 224 the first non-target article opposite the first horizontal direction relative to the target article (see e.g. FIG. 4g-i), such as to provide a difference between horizontal positions of a front target article face of the target article and a front first non-target article face of the first non-target article.

The method 200' comprises positioning 212 the platform in a second vertical platform position (see e.g. FIG. 4l). The second vertical platform position may be below the first vertical platform position. For example, the distance between the first vertical platform position and the second vertical platform position may be a target article height of the target article. Lowering the platform to the second vertical platform position may provide that the first non-target article may be repositioned 210 off the platform without falling or tilting. It is noted that the additional steps of the method 200', such as positioning 202, repositioning 224 and/or positioning 212 may be provided in combination, as shown, or in any combination omitting one or more of the additional steps.

Figure 7:
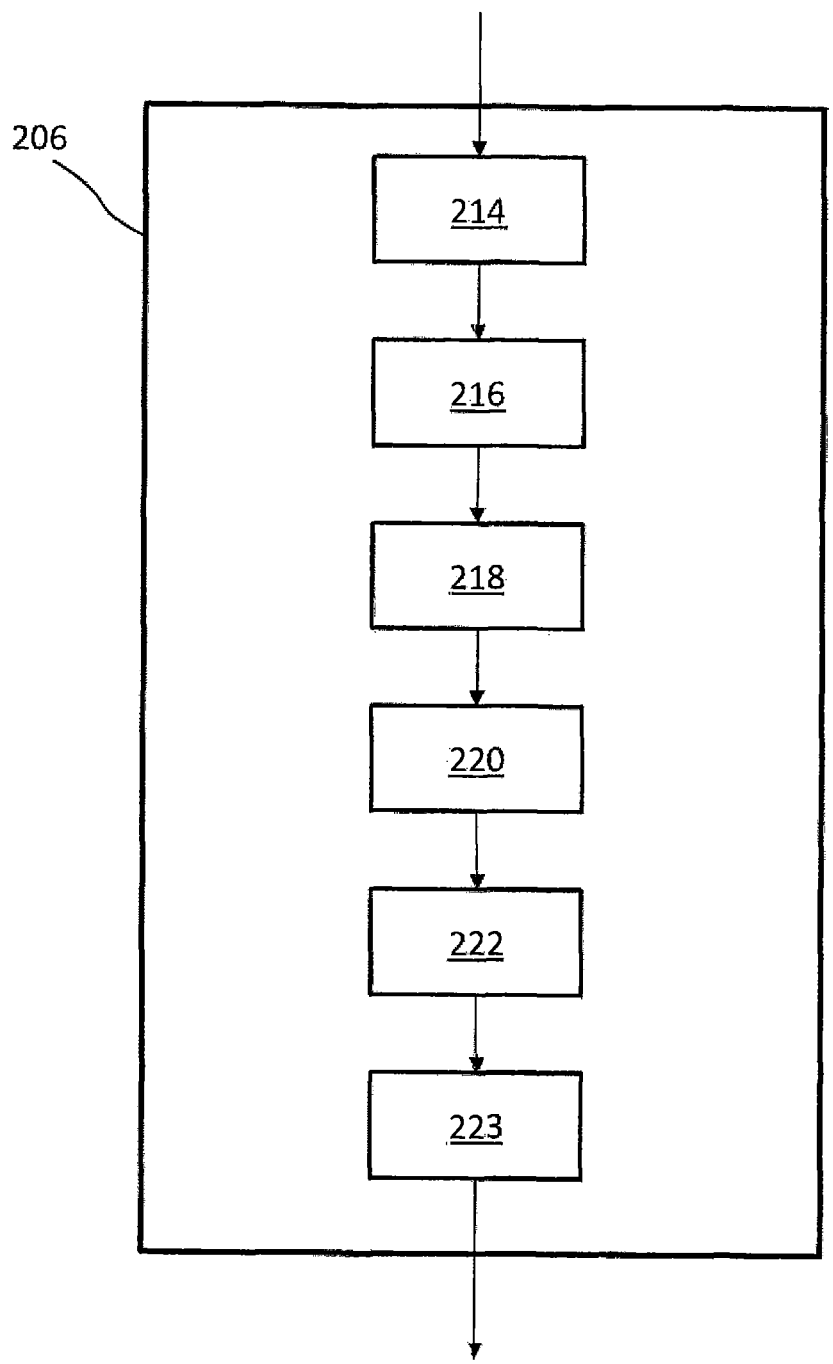
FIG. 7 shows a flow chart of a step of an exemplary method.

FIG. 7 shows a flow chart of the step of positioning 206 the platform in the first vertical platform position of an exemplary method, such as the method 200 or 200' of the previous figures.

Positioning 206 the platform in the first vertical platform position may comprise positioning 214 the platform in a third vertical platform position (see e.g. FIG. 4b). The third vertical platform position may be a minimum height below a target identification tag of the target article. The minimum height may be a predefined height, such as a known minimum height of articles.

Positioning 206 the platform in the first vertical platform position may comprise applying 216 reposition force to the target article in a first horizontal direction, at a first vertical repositioning position (see e.g. FIG. 4*c*). The first horizontal direction may be from the article stack and towards the platform. The first vertical repositioning position may be at the target identification tag.

Positioning 206 the platform in the first vertical platform position may comprise detecting 218 the applied reposition force. The detected applied reposition force may be compared to a force threshold, such as a pre-set force-threshold, e.g. indicating whether the target article is blocked from being repositioned in the first horizontal direction.

In accordance with the applied reposition force increasing above the force threshold, positioning 206 the platform in the first vertical platform position may comprise positioning 220, such as lowering, the platform to a fourth vertical platform position (see e.g. FIG. 4*d*). For example, to remove the platform such that it does not block the target article from being repositioned. The platform may be lowered by the minimum height. The fourth vertical platform position may be a multiple of the minimum height below the third vertical platform position.

In accordance with the applied reposition force being below the force threshold, positioning 206 the platform in the first vertical platform position may comprise repositioning 222 the target article and the first non-target article a first length in the first horizontal direction (see e.g. FIG. 4*e*). For example, such as to provide a part of the target article and the first non-target article above the platform and part of the target article and the first non-target article in engagement with the article stack or in engagement with a storage rack of the storage facility.

Figure 8:
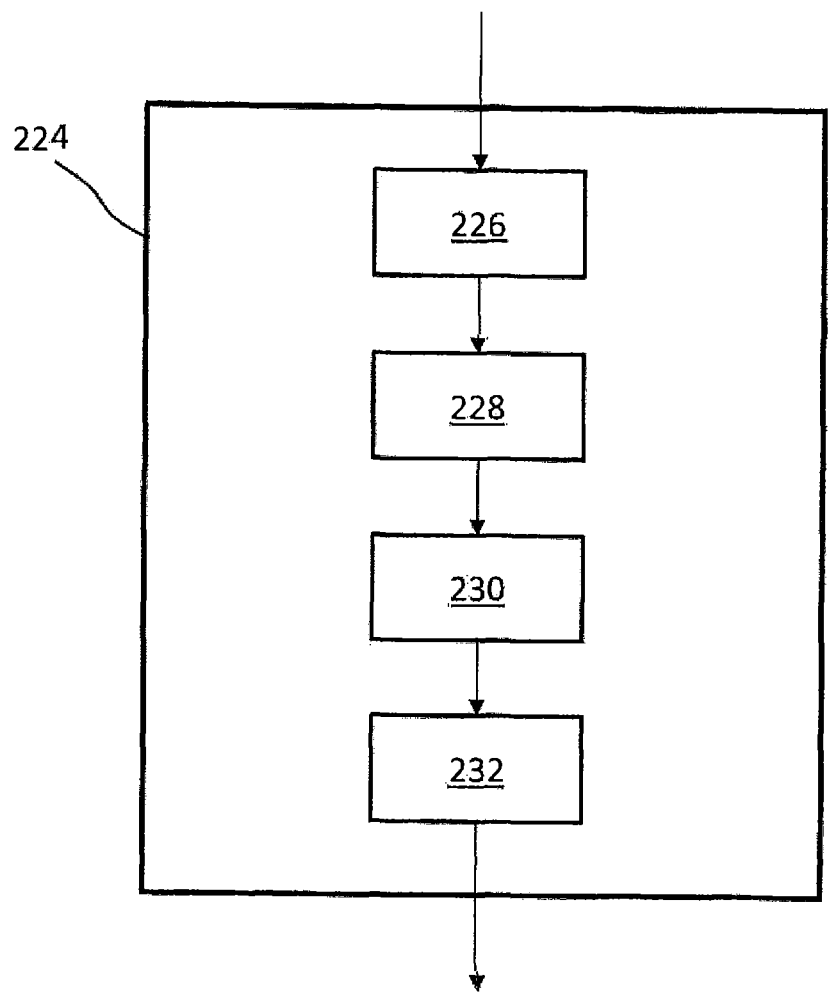
FIG. 8 shows a flow chart of a step of an exemplary method.

Positioning 206 the platform in the first vertical platform position may comprise raising 223 the platform until the platform surface is within a predetermined distance of the lower target article face (see e.g. FIG. 4*f*), e.g. until the platform is in the first vertical platform position. FIG. 8 shows a flow chart of the step of repositioning 224 the first non-target article opposite the first horizontal direction relative to the target article of an exemplary method, such as the method 200' of FIG. 6.

Repositioning 224 the first non-target article may comprise applying 226 reposition force opposite the first horizontal direction at a second vertical repositioning position (see e.g. FIG. 4*g*). The second repositioning position may be a minimum height above a target identification tag of the target article, such as the minimum height above the first repositioning position.

Repositioning 224 the first non-target article may comprise detecting 228 movement of the target article in the first horizontal direction. For example, movement may be detected 228 while applying 226 reposition force opposite the first horizontal direction at the second vertical repositioning position. Detecting 228 movement of the target article indicate whether the second vertical repositioning position is at the target article or at the first non-target article above the target article.

In accordance with detection of movement of the target article, repositioning 224 the first non-target may comprise applying 230 reposition force opposite the first horizontal direction at a third vertical repositioning position (see e.g. FIG. 4*h*). Applying 226 reposition force at the second vertical repositioning position may be ceased. The third vertical repositioning position may be above the second vertical repositioning position. The third vertical repositioning position may be a multiple of the minimum height above the second vertical repositioning position.

In accordance with no detection of movement of the target article, the first non-target article is repositioned 232 opposite the first horizontal direction relative to the target article (see e.g. FIG. 4*i*), e.g. by the applied 226,230 reposition force at either the second or third vertical repositioning position.

Figure 9:
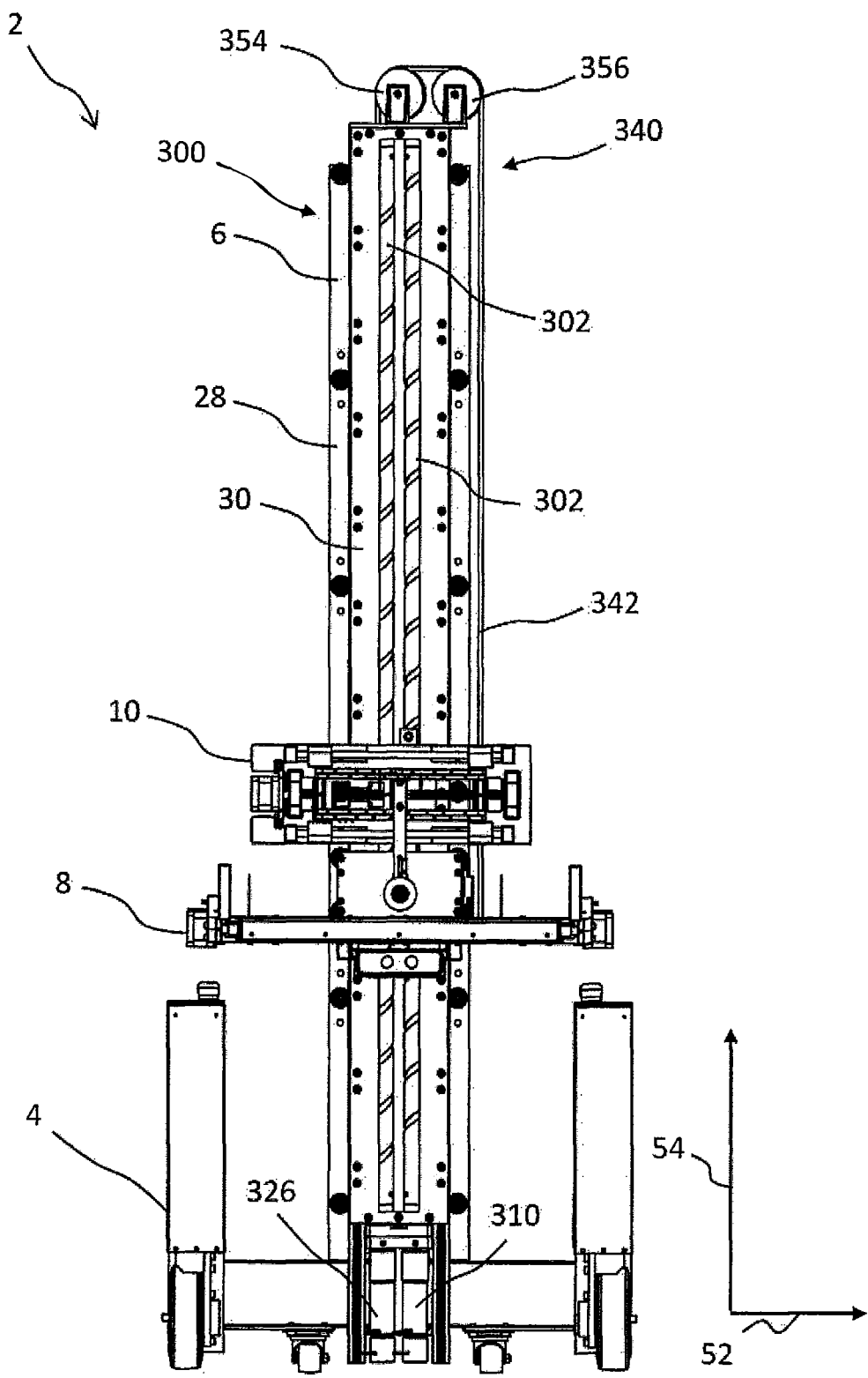
FIG. 9 schematically illustrates an exemplary robot.

FIG. 9 schematically illustrates an exemplary robot 2, such as the exemplary robot as exemplified in relation to FIG. 1. The robot 2 comprises a vertical element 6.

The vertical element 6 is a telescopic element. The vertical element 6 comprises a first vertical element part 28, and a second vertical element part 30. The second vertical element part 30 is displaceable relative to the first vertical element part 28 along the vertical direction 54.

The robot 2 comprises a vertical positioning system 300. The vertical positioning system 300 is configured to vertically move the platform 8 and/or the repositioning device 10 along the vertical direction 54. From a low position, the platform 8 and/or the repositioning device 10 may move up along the second vertical element part 30 until the repositioning device 10 reaches a top most position of the second vertical element part 30, where after the vertical positioning system 300 moves the second vertical element part 30 and the platform and/or the repositioning device 10 together along the vertical direction 54.

The vertical positioning system 300 comprises lead screws 302 to vertically position the platform 8 and the repositioning device 10, respectively. Vertical positioning drive modules 310, 326 are configured to turn the lead screws 302, such as to vertically position the platform 8 and the repositioning device 10, respectively.

The robot 2 comprises a cable reel system 340. The cable reel system 340 is configured to store cable connecting the platform 8 and/or repositioning device 10 with other components, such as components located in the base. Storing of cable is necessary as the distance between the base and the platform 8 and/or repositioning device 10 is changing as the platform 8 and/or repositioning device 10 is vertically moved. The cable reel system 340 provides that the cable 342 is maintained straight in all positions of the platform 8 and/or repositioning device 10. A second cable pully 354 and a third cable pully 356 of the cable reel system 340 are shown.

Figure 10:
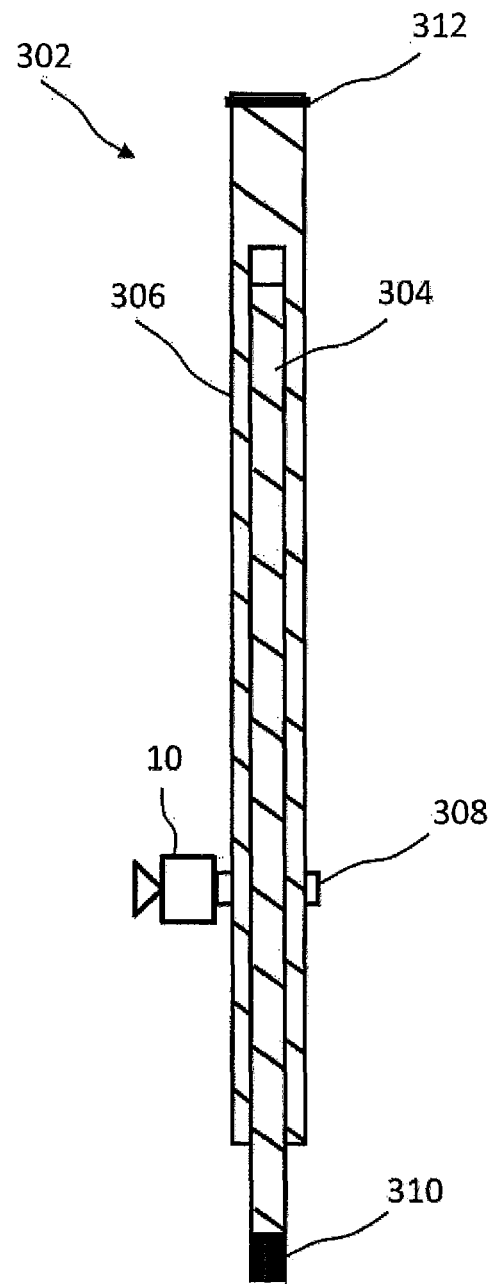
FIG. 10 schematically illustrates an exemplary lead screw of an exemplary vertical positioning system.

FIG. 10 illustrates an exemplary lead screw 302 of an exemplary vertical positioning system 300. The lead screw 302 comprises an inner lead screw 304 and an outer lead screw 306. The inner lead screw 304 are threaded in the outer lead screw 306, such that rotation of the inner lead screw 304 relative to the outer lead screw 306 results in elongation or shortening of the lead screw 302. The inner lead screw 304 is connected to a vertical positioning drive module, such as a first vertical positioning drive module 310. A lead screw coupling 308 is threaded onto the outer lead screw 306, and couples the repositioning device 10 to the outer lead screw 306. The lead screw coupling 308 is rotationally restricted.

Turning of the inner lead screw 304 by the vertical positioning drive module 310, 326, will rotate the outer lead screw 306. Because the lead screw coupling 308 is rotationally restricted, rotation of the outer lead screw 306 will result in the lead screw coupling 308 and the repositioning device 10 being vertically moved.

The repositioning device 10 and the lead screw coupling 308 may be vertically moved up to a top stop 312. The top stop 312 may restrict further upwards vertically movement of the lead screw coupling 308. The lead screw coupling 308 will therefore in such position restrict rotation of the outer lead screw 306. Thereby, further rotation of the inner lead screw 304 will lead to relative rotation between the inner lead screw 304 and the outer lead screw 306. Relative rotation between the inner lead screw 304 and the outer lead screw 306 will result in elongation of the lead screw 302.

The second vertical element part 30 (see FIG. 9), rests on the outer lead screw 306. Thus, elongation of the lead screw 302 will result in the second vertical element part being vertically moved upwards relative to the first vertical element part 28 (see FIG. 9). Thus, elongation of the lead screw 302 results in elongation of the vertical element 6 (see FIG. 9)

A similar system may be provided for vertically moving the platform, e.g. movable by a second vertical positioning drive module.

Figure 11:
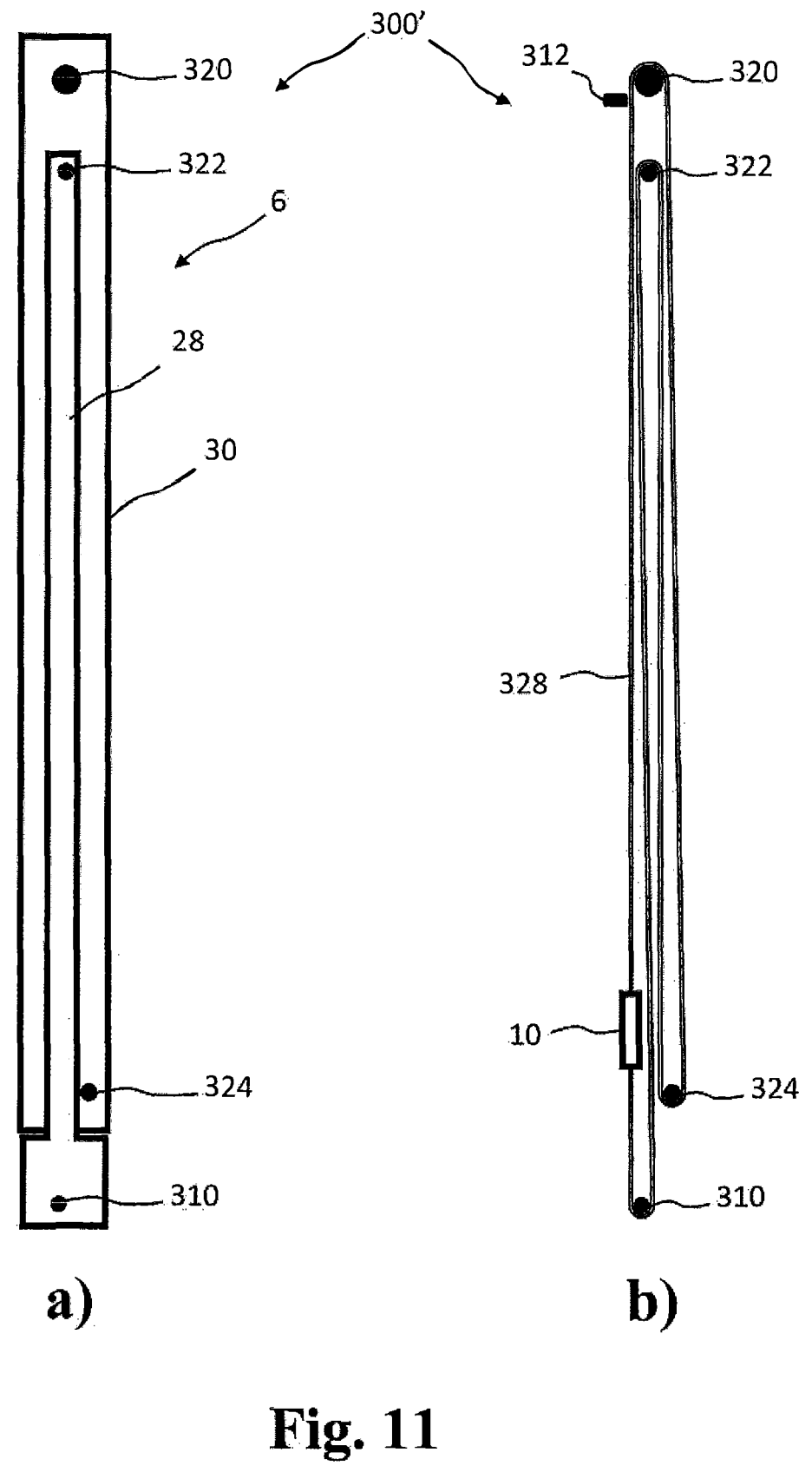

FIG. 11 illustrates another exemplary vertical positioning system 300' comprising a drive belt 328.

In FIG. 11*a* is shown the vertical element 6 comprising the first vertical element part 28 and the second vertical element part 30. In FIG. 11*b* is shown the drive belt 328, while the vertical element 6 is omitted to allow for a better view of the drive belt configuration.

The vertical positioning system 300' comprises a first vertical positioning drive module 310 attached to the first vertical element part 28. The vertical positioning system 300' comprises a first drive pully 320, a second drive pully 322 and a third drive pully 324. The first drive pully 320 and the third drive pully 324 are attached to the second vertical element part 30. The second drive pully 322 is attached to the first vertical element part 28. Thus, the first drive pully 320 and the third drive pully 324 may be vertically movable along with the second vertical element part 30 relative to the first vertical positioning drive module 310, the second drive pully 322 and the first vertical element part 28.

The drive belt 328 is attached to the repositioning device 10, such that driving of the drive belt 328 by the first vertical positioning drive module 310 results in vertical movement of the repositioning device 10. The repositioning device 10 may be moved upwards until it reaches a top stop 312. The top stop 312 restricts further upwards movement of the repositioning device 10 relative to the second vertical element part 30. Further driving of the drive belt 328 by the first vertical positioning drive module 310, while the repositioning device 10 is restricted from further movement relative to the second vertical element part 30 will result in the third drive pully 324 being pulled upwards, thus resulting in the second vertical element part 30 being vertically moved upwards relative to the first vertical element part 28.

Figure 12:
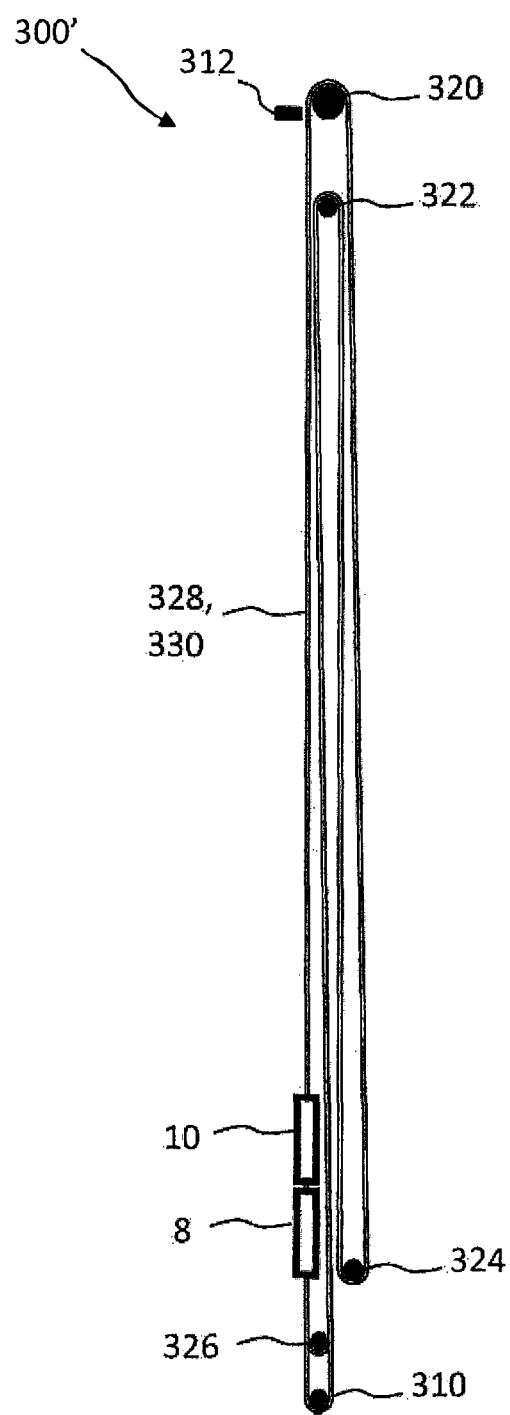
FIG. 12 schematically illustrates an exemplary vertical positioning system.

FIG. 12 illustrates the exemplary vertical positioning system 300' wherein a second drive belt 330 and a second vertical positioning drive module 326 are provided. The first vertical positioning drive module 310 drives the first drive belt 328 moving the repositioning device 10. The second vertical positioning drive module 326 drives the second drive belt 330 moving the platform 8. The second drive belt 330 may be positioned behind the first drive belt 328 as shown. Thus, the drive pullies for the first drive belt 328 and the drive pullies for the second drive belt 330 may be positioned on top of each other, e.g. sharing the same axle.

Figure 13:
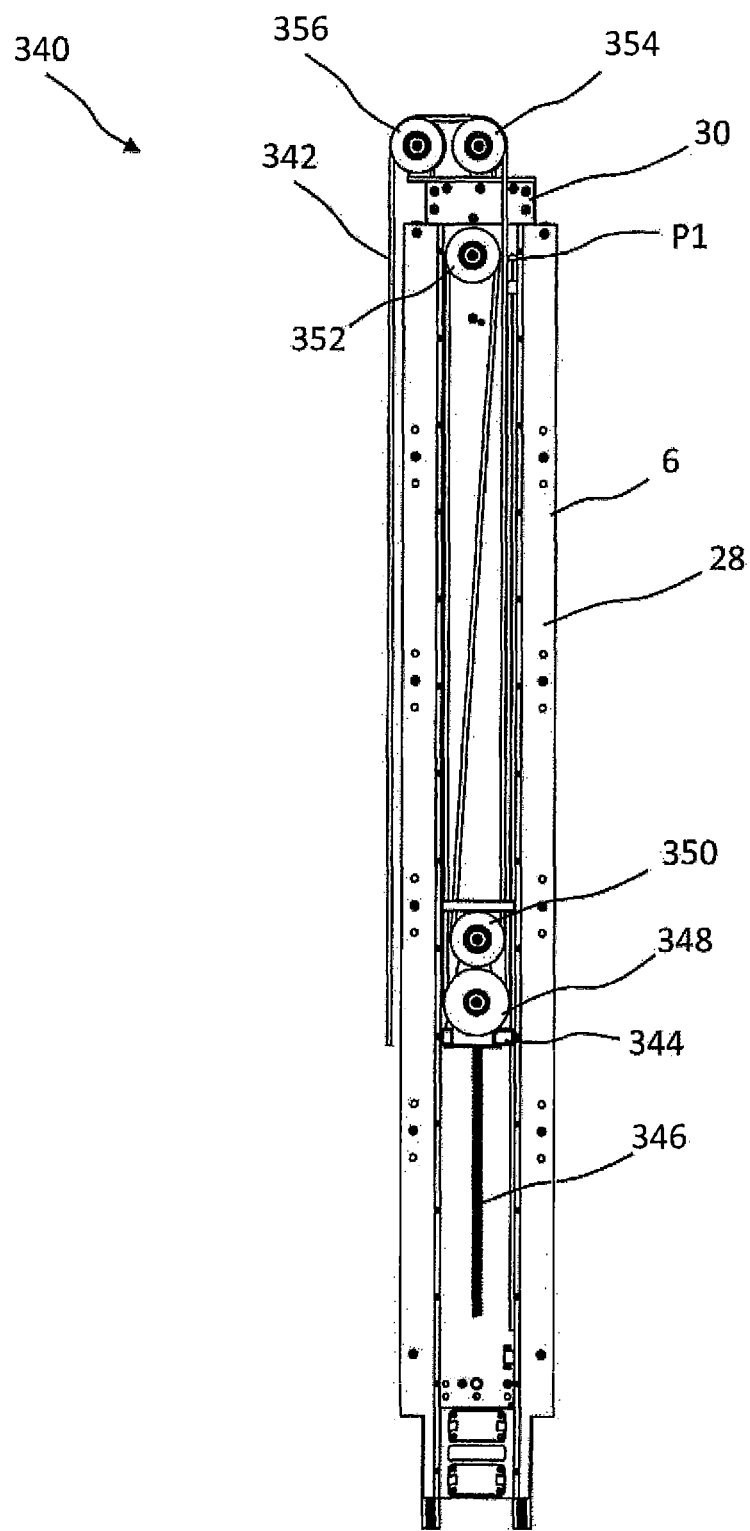
FIG. 13 schematically illustrates an exemplary cable reel system.

FIG. 13 illustrates an exemplary cable reel system 340. The cable reel system 340 is configured to take up excess cable of a cable 342, e.g. when the repositioning device and/or the platform are in non-extreme positions, and/or when the vertical element 6, e.g. being telescopic, is in a non-extended position. The cable reel system 340 is positioned on the vertical element 6.

The cable reel system 340 comprises a sliding element 344. The sliding element 344 comprises a first slide pully 348 and a second slide pully 350. The sliding element 344 is vertically movable along the vertical element 6. A spring element 346 is attached to the sliding element 344. The spring element 346 bias the sliding element 344 in a downward direction.

The cable reel system 340 comprises a plurality of cable pullies, e.g. including a first cable pully 352, a second cable pully 354 and a third cable pully 356. The first cable pully 352, the second cable pully 354 and the third cable pully 356 is attached to the vertical element 6. The first cable pully 352 may be attached to a first vertical element part 28 of the vertical element 6. The second cable pully 354 and the third cable pully 356 may be attached to a second vertical element part 30 of the vertical element 6. In an alternative configuration, the second and third cable pully may be exchanged with a single pully, e.g. having a diameter bigger than the diameter of the first cable pully 352.

The cable 342 extends from the base, e.g. from the bottom end of the vertical element 6. From the bottom part of the vertical element 6, the cable 342 is fixed, e.g. glued, along the side of the vertical element 6, such as the first vertical element part 28 of the vertical element 6, to a first point P1. From the first point P1, the cable 342 is looped through the first slide pully 348. From the first slide pully 348 the cable 342 is looped through the first cable pully 352. From the first cable pully 352 the cable 342 is looped through the second slide pully 350. From the second slide pully 350 the cable 342 is passed above the second cable pully 354 and third cable pully 356 and attached to the platform and repositioning device (not shown).

Figure 14:
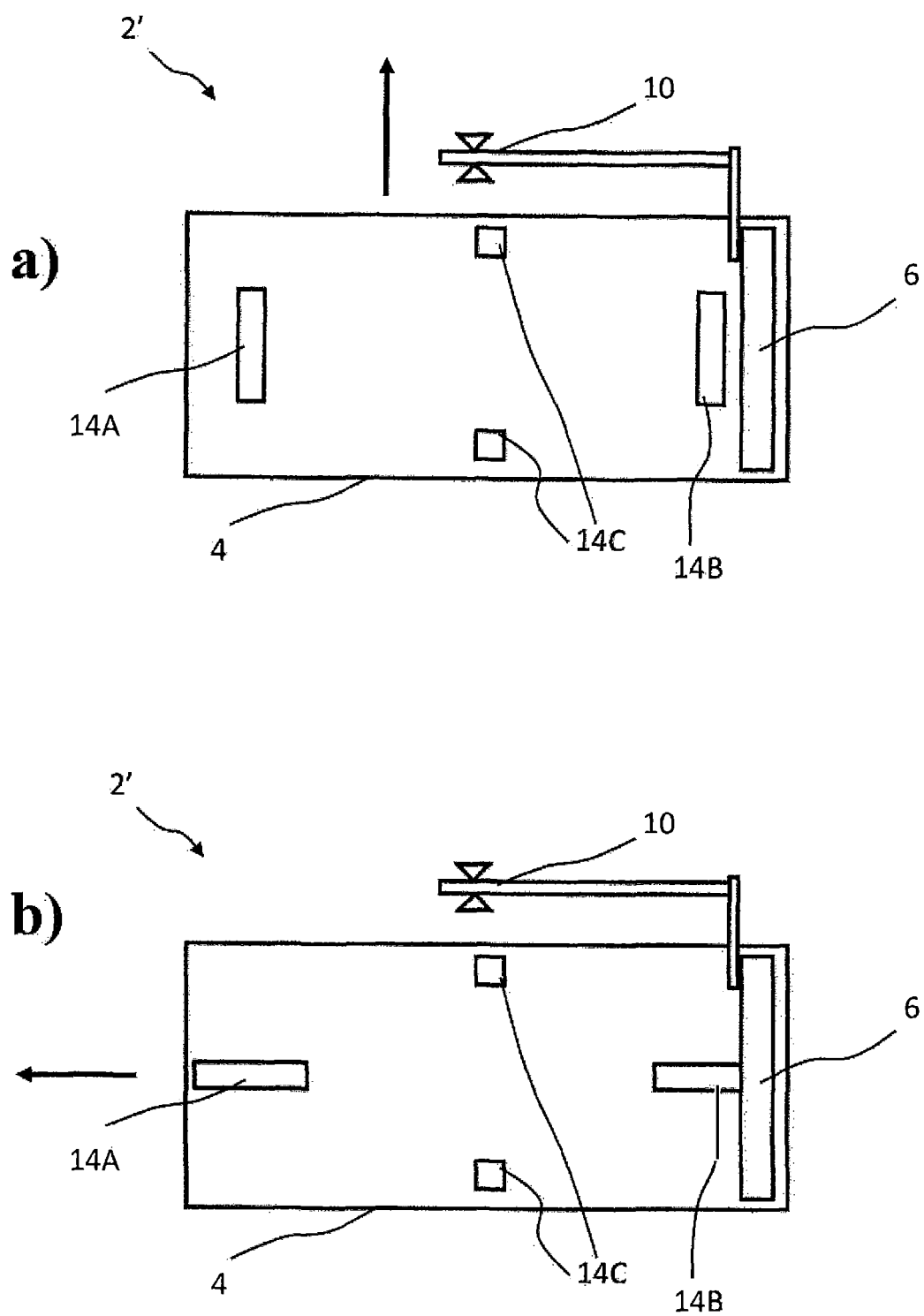
FIG. 14 schematically illustrates an exemplary robot.

FIG. 14 schematically illustrates an exemplary robot 2', seen from above. The robot 2' comprises a base 4, a vertical element 6, a platform (omitted for intelligibility), a repositioning device 10, and a plurality of wheels 14A-C. Although not specifically mentioned, the robot 2' may additionally comprise some or all the features as described in relation to any of the previous figures.

The robot 2' comprises a first wheel 14A, a second wheel 14B, and two third wheels 14C. The third wheels 14C are passive wheels added for stability of the robot 2'. The third wheels 14C may turn in either direction. One of the two third wheels 14C may be omitted. The first wheel 14A and the second wheel 14B are steerable, and may be used to control the direction of travel of the robot 2'. As exemplified in FIG. 14*a*, the first wheel 14A and the second wheel 14B are positioned such that the robot 2' is traveling in the direction of the arrow. As exemplified in FIG. 14*b*, the first wheel 14A and the second wheel 14B are turned to be positioned such that the robot 2' is traveling in a direction as indicated by the arrow, perpendicular to the direction of FIG. 14*a*. Hence, the robot 2' may be traveling sideways.

The base 4 is rectangular, e.g. has a first base dimension that is smaller than a second base dimension. The first base dimension may be between 20-40 cm, such as 30 cm. This may allow the robot 2' to enter into more confined spaces, since the robot 2' is able to move sideways. The robot 2' is able to orientate before entering any confined space, and enter the confined space in the orientation requiring less space, e.g. sideways, such as the illustrated in FIG. 14*b*.

The repositioning device 10 is configured to reposition articles on and off the platform. The repositioning device 10 may be configured to reposition articles on and off the platform from two sides, e.g. two opposite sides, as illustrated. The repositioning device 10 may comprise an attachment device, such as a suction device, on each side. Alternatively, the repositioning device 10 may comprise an attachment device, such as a suction device, that is able to move between the two sides, e.g. turn over from one side to the other side. The repositioning device 10 may be configured to reposition articles on and off the platform in a direction of the first base dimension, such as the smaller dimension of the base 4. The need to rotate the robot 2', e.g. at confined space may be limited, because it may enter, e.g. between racks of articles, in the direction as shown in FIG. 14b and fetch an article from the racks perpendicular to the direction of travel.

The repositioning device 10 may be coupled to the vertical element 6. The repositioning device 10 may be telescopically coupled to the vertical element 6, as illustrated, e.g. such as to extend to positions beyond the first base dimension and/or beyond the platform.

Items

Exemplary methods and robots are disclosed by the following items.

1. A method for retrieval of a target article from an article stack, the article stack comprising the target article and a first non-target article being positioned on top of the target article, the target article being arranged in the article stack with a lower target article face being at a first vertical stack position,
    the method comprises:
    identifying the target article;
    positioning a platform having a platform surface in a first vertical platform position wherein the platform surface is at the first vertical stack position or below the first vertical stack position;
    repositioning the target article and the first non-target article in a first horizontal direction onto the platform;
    repositioning the first non-target article opposite the first horizontal direction off the platform.

2. Method according to item 1, wherein after repositioning of the target article and the first non-target article onto the platform, the method comprises positioning the platform in a second vertical platform position below the first vertical platform position.

3. Method according to item 2, wherein the target article has a target article height, and the distance between the first vertical platform position and the second vertical platform position is the target article height.

4. Method according to any of the preceding items, wherein positioning the platform in the first vertical platform position comprises:
    positioning the platform in a third vertical platform position, the third vertical platform position being a minimum height below a target identification tag of the target article,
    applying reposition force to the target article in the first horizontal direction, at a first vertical repositioning position,
    detecting the applied reposition force, and
        in accordance with the applied reposition force increasing above a force threshold, lowering the platform to a fourth vertical platform position,
        in accordance with the applied reposition force being below the force threshold, repositioning the target article and the first non-target article a first length in the first horizontal direction,
    positioning the platform in the first vertical platform position by raising the platform until the platform surface is within a predetermined distance of the lower target article face.

5. Method according to item 4, wherein the fourth vertical platform position is a multiple of the minimum height below the third vertical platform position.

6. Method according to any of items 4-5, wherein the first length is less than 50%, such as less than 40%, such as 30% of a minimum depth of an article.

7. Method according to any of the preceding items comprising repositioning the first non-target article opposite the first horizontal direction relative to the target article.

8. Method according to item 7, wherein repositioning the first non-target article comprises:
    applying reposition force opposite the first horizontal direction at a second vertical repositioning position,
    detecting movement of the target article in the first horizontal direction,
        in accordance with detection of movement of the target article, applying reposition force opposite the first horizontal direction at a third vertical repositioning position,
        in accordance with no detection of movement of the target article, repositioning the first non-target article opposite the first horizontal direction relative to the target article.

9. Method according to item 8, wherein the second vertical repositioning position is a minimum height above a target identification tag of the target article.

10. Method according to any of items 8-9, wherein the third vertical repositioning position is a multiple of the minimum height above the second vertical repositioning position.

11. Method according to any of the preceding items, wherein the article stack is an article stack of a plurality of article stacks in a storage facility, the storage facility comprising a plurality of articles arranged in the plurality of article stacks, the plurality of articles comprises the target article and the first non-target article.

12. A method for retrieval of a target article from an article stack, the article stack comprising the target article and a first non-target article being positioned on top of the target article, the target article being arranged in the article stack with a lower target article face being at a first vertical stack position, the target article comprising a target identification tag on a front target article face,
    the method comprises:
    identifying the target article;
    positioning a platform in a first vertical platform position wherein an platform surface is at the first vertical stack position or below the first vertical stack position, wherein positioning the platform in the first vertical platform position comprises:
        positioning the platform in a third vertical platform position, the third vertical platform position being a minimum height below the target identification tag,
        applying reposition force to the target article in the first horizontal direction, at a first vertical repositioning position,
        detecting the applied reposition force, and
            in accordance with the applied reposition force increasing above a force threshold, lowering the platform to a fourth vertical platform position,
            in accordance with the applied reposition force being below the force threshold, repositioning the target article and the first non-target article a first length in the first horizontal direction, positioning the platform in the first vertical platform position by raising the platform until the platform surface is within a predetermined distance of the lower target article face, repositioning the first non-target article opposite the first horizontal direction relative to the target article, wherein repositioning the first non-target article comprises:

applying reposition force opposite the first horizontal direction at a second vertical repositioning position, detecting movement of the target article in the first horizontal direction, in accordance with detection of movement of the target article, applying reposition force opposite the first horizontal direction at a third vertical repositioning position, in accordance with no detection of movement of the target article, repositioning the first non-target article opposite the first horizontal direction relative to the target article, repositioning the target article and the first non-target article in a first horizontal direction onto the platform;

positioning the platform in a second vertical platform position below the first vertical platform position;

repositioning the first non-target article opposite the first horizontal direction off the platform.

13. A robot for retrieval of a target article from an article stack, the article stack comprising the target article and a first non-target article being positioned on top of the target article, the target article being arranged in the article stack with a lower target article face being at a first vertical stack position, the robot comprising:
a platform being vertically movable, the platform having a platform surface,
a repositioning device being vertically movable,
an identification device;
the robot being configured to:
identify the target article by the identification device;
position the platform in a first vertical platform position wherein the platform surface is at the first vertical stack position or below the first vertical stack position;
reposition the target article and the first non-target article in a first horizontal direction onto the platform;
reposition the first non-target article opposite the first horizontal direction off the platform.

14. Robot according to item 13, wherein, after reposition of the target article and the first non-target article onto the platform, the robot is configured to position the platform in a second vertical platform position below the first vertical platform position.

15. Robot according to item 14, wherein the target article has a target article height, and the distance between the first vertical platform position and the second vertical platform position is the target article height.

16. Robot according to any of items 13-15 wherein, to position the platform in the first vertical platform position, the robot is configured to:

position the platform in a third vertical platform position, the third vertical platform position being a minimum height below a target identification tag of the target article, apply reposition force to the target article in the first horizontal direction, at a first vertical repositioning position, detect the applied reposition force, and
in accordance with the applied reposition force increasing above a force threshold, lower the platform to a fourth vertical platform position, in accordance with the applied reposition force being below the force threshold, reposition the target article and the first non-target article a first length in the first horizontal direction, position the platform in the first vertical platform position by raising the platform until the platform surface is within a predetermined distance of the lower target article face.

17. Robot according to item 16, wherein the fourth vertical platform position is a multiple of the minimum height below the third vertical platform position.

18. Robot according to any of items 16-17, wherein the platform comprises optical sensors, and wherein the platform surface being within the predetermined distance of the lower target article face is detected by the optical sensors of the platform.

19. Robot according to any of items 16-18, wherein the first length is less than 50%, such as less than 40%, such as 30% of a minimum depth of an article.

20. Robot according to any of items 13-19, wherein the robot is configured to reposition the first non-target article opposite the first horizontal direction relative to the target article.

21. Robot according to item 20, wherein to reposition the first non-target article the robot is configured to:

apply reposition force opposite the first horizontal direction at a second vertical repositioning position, detect movement of the target article in the first horizontal direction, in accordance with detection of movement of the target article, apply reposition force opposite the first horizontal direction at a third vertical repositioning position, in accordance with no detection of movement of the target article, reposition the first non-target article opposite the first horizontal direction relative to the target article.

22. Robot according to item 21, wherein the second vertical repositioning position is a minimum height above a target identification tag of the target article.

23. Robot according to any of items 21-22, wherein the third vertical repositioning position is a multiple of the minimum height above the second vertical repositioning position.

24. Robot according to any of items 13-23 comprising a base.

25. Robot according to any of items 24 comprising a vertical element extending from the base, and wherein the platform and/or the repositioning device are attached to the vertical element.

26. Robot according to any of items 24-25, wherein the robot is configured to position the base in a position relative to the article stack.

27. Robot according to any of items 24-26, wherein the base comprises a plurality of wheels.

28. Robot according to any of items 13-27, wherein the repositioning device is arranged above the platform, and the repositioning device being vertically movable above the platform.

29. Robot according to any of items 13-28, wherein the article stack is an article stack of a plurality of article stacks in a storage facility, the storage facility comprising a plurality of articles arranged in the plurality of article stacks, the plurality of articles comprises the target article and the first non-target article.

30. Robot according to item 29 comprising a navigation sensor, and the robot being configured to automatically navigate around in the storage facility.

31. Robot according to any of items 29-30, wherein the robot is configured to perform routine scans of the plurality of articles in the storage facility, and wherein the robot is configured to determine a position relative to the article stack based on storage article positions obtained by the routine scans.

32. A robot for retrieval of a target article from an article stack, the article stack comprising the target article and a first non-target article being positioned on top of the target article, the target article being arranged in the article stack with a lower target article face being at a first vertical stack position,
the robot comprising:
a base,
a platform being vertically movable, the platform having a platform surface,
a repositioning device being vertically movable,
an identification device;
the robot being configured to:
position the base in a position relative to the article stack;
identify the target article by the identification device;
position the platform in a first vertical platform position wherein the platform surface is at the first vertical stack position or below the first vertical stack position, wherein, to position the platform in the first vertical platform position, the robot is configured to:
position the platform in a third vertical platform position, the third vertical platform position being a minimum height below a target identification tag of the target article,
apply reposition force to the target article in the first horizontal direction, at a first vertical repositioning position,
detect the applied reposition force, and
in accordance with the applied reposition force increasing above a force threshold, lower the platform to a fourth vertical platform position,
in accordance with the applied reposition force being below the force threshold, reposition the target article and the first non-target article a first length in the first horizontal direction,
position the platform in the first vertical platform position by raising the platform until the platform surface is within a predetermined distance of the lower target article face;
reposition the first non-target article opposite the first horizontal direction relative to the target article, wherein to reposition the first non-target article the robot is configured to:
apply reposition force opposite the first horizontal direction at a second vertical repositioning position,
detect movement of the target article in the first horizontal direction,
in accordance with detection of movement of the target article, apply reposition force opposite the first horizontal direction at a third vertical repositioning position,
in accordance with no detection of movement of the target article, reposition the first non-target article opposite the first horizontal direction relative to the target article;
reposition the target article and the first non-target article in a first horizontal direction onto the platform;
position the platform in a second vertical platform position below the first vertical platform position;
reposition the first non-target article opposite the first horizontal direction off the platform.

LIST OF REFERENCES 2 robot
4 base
6 vertical element
8 platform
9 platform surface
10 repositioning device
12 identification device
14 wheel
16 navigation sensor
18 processing unit
20 battery
22 force sensor
24 optical sensor
26 lateral positioning elements
28 first vertical element part
30 second vertical element part
50 first horizontal direction
52 second horizontal direction
54 vertical direction
100 storage facility
102 storage rack
104 storage shelve
112 article stack
114 target article
116 first non-target article
118 second non-target article
130 lower face
132 front face
134 upper face
136 back face
138 first side face
140 second side face
142 identification tag
150 article height
152 article depth
154 article width
200, 200' method
202 positioning relative to the article stack
204 identifying target article
206 positioning platform in first vertical platform position
208 repositioning target article and first non-target article
210 repositioning first non-target article
212 positioning platform in second vertical platform position
214 positioning platform in third vertical platform position
216 applying reposition force
218 detecting applied reposition force
220 positioning platform in fourth vertical platform position
222 repositioning target article and first non-target article
223 raising platform
224 repositioning first non-target article
226 applying reposition force at second vertical repositioning position
228 detecting movement of target article
230 applying reposition force at third vertical repositioning position
232 repositioning first non-target article
300, 300' vertical positioning system 302 lead screw
304 inner lead screw
306 outer lead screw
308 lead screw coupling
310 first vertical positioning drive module
312 top stop
320 first drive pully
322 second drive pully
324 third drive pully
326 second vertical positioning drive module
328 (first) drive belt
330 second drive belt
340 cable reel system
342 cable
344 sliding element
346 spring element
348 first slide pully
350 second slide pully
352 first cable pully
354 second cable pully
356 third cable pully

The invention claimed is:

1. A method for retrieval of a target article from an article stack, the article stack comprising the target article and a first non-target article being positioned on top of the target article, the target article being arranged in the article stack with a lower target article face being at a first vertical stack position,
the method comprises:
identifying the target article;
positioning a platform having a platform surface in a first vertical platform position wherein the platform surface is at the first vertical stack position or below the first vertical stack position;
repositioning the target article and the first non-target article in a first horizontal direction onto the platform;
repositioning the first non-target article opposite the first horizontal direction off the platform.

2. Method according to claim 1, wherein after repositioning of the target article and the first non-target article onto the platform, the method comprises positioning the platform in a second vertical platform position below the first vertical platform position.

3. Method according to claim 2, wherein the target article has a target article height, and the distance between the first vertical platform position and the second vertical platform position is the target article height.

4. Method according to claim 1, wherein positioning the platform in the first vertical platform position comprises:
positioning the platform in a third vertical platform position, the third vertical platform position being a minimum height below a target identification tag of the target article,
applying reposition force to the target article in the first horizontal direction, at a first vertical repositioning position,
detecting the applied reposition force, and
in accordance with the applied reposition force increasing above a force threshold, lowering the platform to a fourth vertical platform position,
in accordance with the applied reposition force being below the force threshold, repositioning the target article and the first non-target article a first length in the first horizontal direction, positioning the platform in the first vertical platform position by raising the platform until the platform surface is within a predetermined distance of the lower target article face.

5. Method according to claim 4, wherein the fourth vertical platform position is a multiple of the minimum height below the third vertical platform position.

6. Method according to claim 4, wherein the first length is less than 50%, such as less than 40%, such as 30% of a minimum depth of an article.

7. Method according to claim 1 comprising repositioning the first non-target article opposite the first horizontal direction relative to the target article.

8. Method according to claim 7, wherein repositioning the first non-target article comprises:
applying reposition force opposite the first horizontal direction at a second vertical repositioning position,
detecting movement of the target article in the first horizontal direction,
in accordance with detection of movement of the target article, applying reposition force opposite the first horizontal direction at a third vertical repositioning position,
in accordance with no detection of movement of the target article, repositioning the first non-target article opposite the first horizontal direction relative to the target article.

9. Method according to claim 8, wherein the second vertical repositioning position is a minimum height above a target identification tag of the target article.

10. Method according to claim 8, wherein the third vertical repositioning position is a multiple of the minimum height above the second vertical repositioning position.

11. A robot for retrieval of a target article from an article stack, the article stack comprising the target article and a first non-target article being positioned on top of the target article, the target article being arranged in the article stack with a lower target article face being at a first vertical stack position,
the robot comprising:
a platform being vertically movable, the platform having a platform surface,
a repositioning device being vertically movable,
an identification device;
the robot being configured to:
identify the target article by the identification device;
position the platform in a first vertical platform position wherein the platform surface is at the first vertical stack position or below the first vertical stack position;
reposition the target article and the first non-target article in a first horizontal direction onto the platform;
reposition the first non-target article opposite the first horizontal direction off the platform.

12. Robot according to claim 11, wherein the platform comprises optical sensors, and wherein the platform surface being within a predetermined distance of the lower target article face is detected by the optical sensors of the platform.

13. Robot according to claim 11 comprising a vertical element, and wherein the platform and/or the repositioning device are attached to the vertical element.

14. Robot according to claim 11, wherein the repositioning device is arranged above the platform, and the repositioning device being vertically movable above the platform.

15. Robot according to claim 11, wherein the robot is configured to position a base of the robot in a position relative to the article stack.

* * * * *